United States Patent
Steven

(10) Patent No.: US 9,643,705 B2
(45) Date of Patent: May 9, 2017

(54) INTEGRATED GRAB BAR AND NAVIGATION CONTROLLER

(71) Applicant: Fox I Steven, Nyack, NY (US)

(72) Inventor: Fox I Steven, Nyack, NY (US)

( * ) Notice: Subject to any disclaimer, the term of this patent is extended or adjusted under 35 U.S.C. 154(b) by 100 days.

(21) Appl. No.: 14/690,385

(22) Filed: Apr. 18, 2015

(65) Prior Publication Data

US 2016/0304180 A1    Oct. 20, 2016

Related U.S. Application Data

(60) Provisional application No. 61/981,747, filed on Apr. 19, 2014.

(51) Int. Cl.
| | | |
|---|---|---|
| *B63H 25/02* | (2006.01) | |
| *G06F 3/01* | (2006.01) | |
| *G05G 13/00* | (2006.01) | |
| *G05G 1/58* | (2008.04) | |
| *B63H 21/21* | (2006.01) | |

(52) U.S. Cl.
CPC .......... *B63H 25/02* (2013.01); *B63H 21/213* (2013.01); *G05G 1/58* (2013.01); *G05G 13/00* (2013.01); *G06F 3/016* (2013.01); *B63H 2025/026* (2013.01); *G06F 2203/015* (2013.01)

(58) Field of Classification Search
CPC ........ B63B 17/04; B63B 17/008; G05G 1/58; G05G 13/00; B63H 25/02
See application file for complete search history.

(56) References Cited

U.S. PATENT DOCUMENTS

| | | |
|---|---|---|
| 4,962,717 A | 10/1990 | Tsumiyama |
| 5,582,529 A | 12/1996 | Montgomery |
| 5,648,708 A | 7/1997 | Littlejohn |
| 5,977,688 A | 11/1999 | Utsunomiya et al. |
| 6,234,100 B1 | 5/2001 | Fadeley et al. |
| 6,406,342 B1 | 6/2002 | Walczak et al. |
| 7,036,445 B2 | 5/2006 | Kaufmann et al. |
| 7,575,491 B1 | 8/2009 | Martin |
| 7,866,272 B2 | 1/2011 | Ullman |
| 8,100,217 B2 | 1/2012 | Crombez |
| 8,212,770 B2 | 7/2012 | Obourn et al. |
| 2001/0042498 A1 | 11/2001 | Burnham |
| 2009/0124144 A1 | 5/2009 | Rui |

(Continued)

OTHER PUBLICATIONS

Marine Power 2008, Jim Barron.

(Continued)

*Primary Examiner* — Stephen Avila
(74) *Attorney, Agent, or Firm* — John J. Daniels

(57) ABSTRACT

A navigation controller for a watercraft includes a grip member and control head that act as an integrated grab bar to be grabbed by a hand of a user and transfer an applied force to a mount. The grip member is engagable by fingers on the hand of the user for providing a grab bar to the user to resist movement of the body of the user caused by the applied force. A control plate supports control switches and is configured and dimensioned relative to the grip member to enable a thumb of the user to engage with one or more of the control switches while the fingers remain engaged with the grip member so that the resistance of the applied force to keep the user steady does not cause a unintended activation of one or more of the control switches.

19 Claims, 14 Drawing Sheets

(56) References Cited

U.S. PATENT DOCUMENTS

2012/0295501 A1 11/2012 Guglielmo
2015/0253801 A1* 9/2015 Wuisan .................... G05G 1/06
                                                        74/479.01

OTHER PUBLICATIONS

The Skier Controlled Tow Boat.
Yamaha FX Cruiser HO (2015-) Captain's Report, Christopher Hughes.
Tactile displays for navigation and orientation : perception and behaviour, May 16, 2007, Erp, J.B.F. van.

* cited by examiner

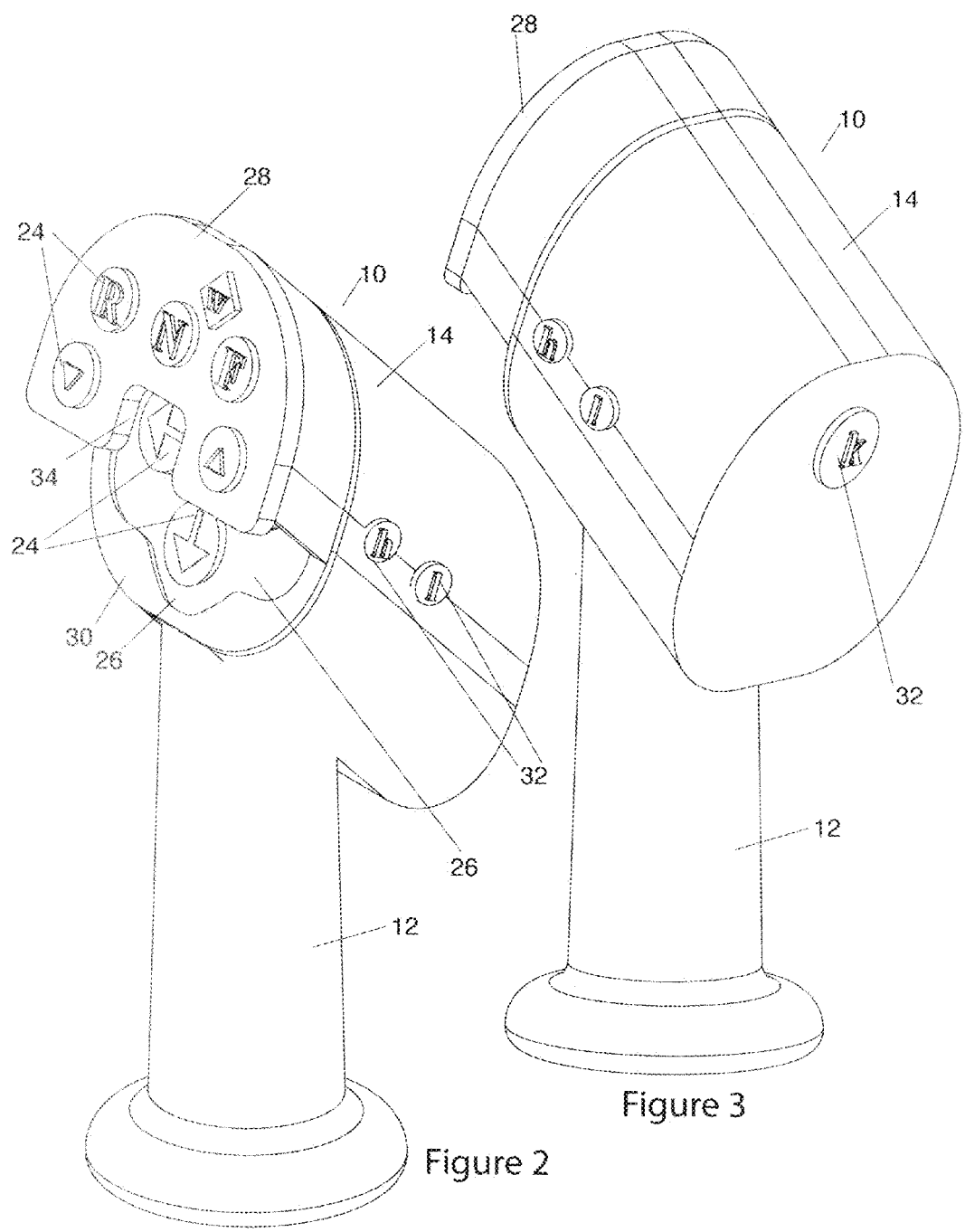

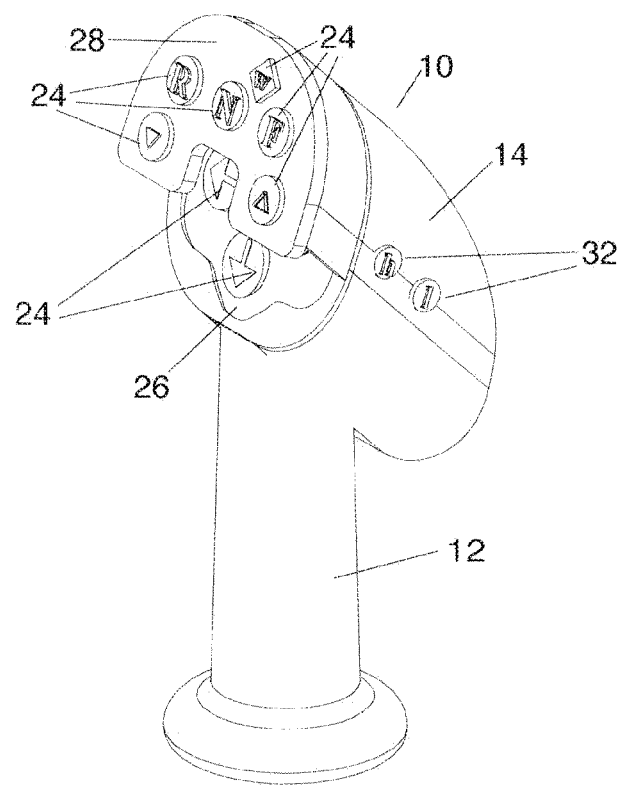
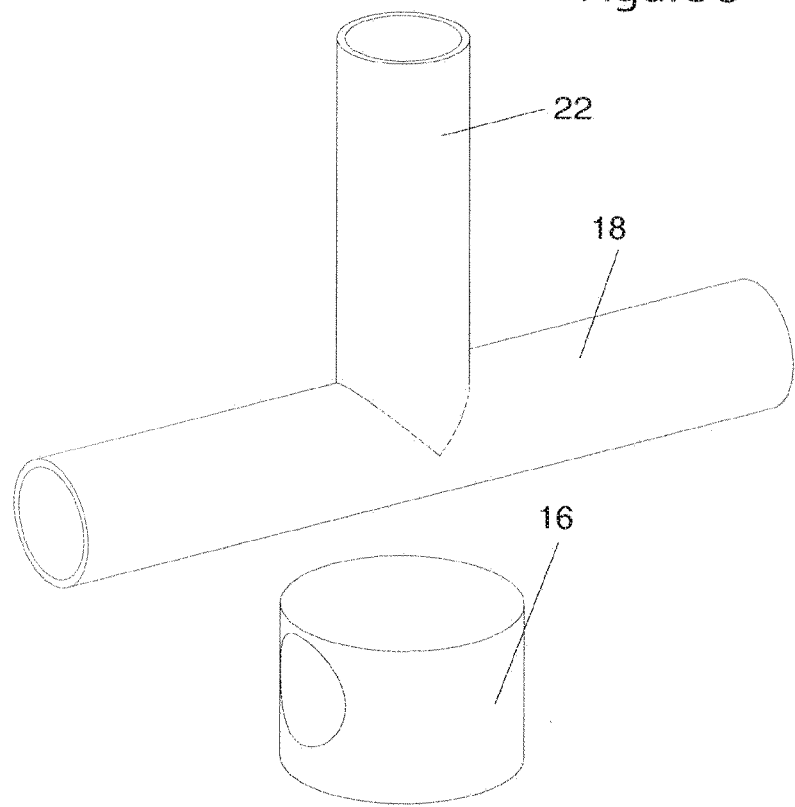
Figure 5

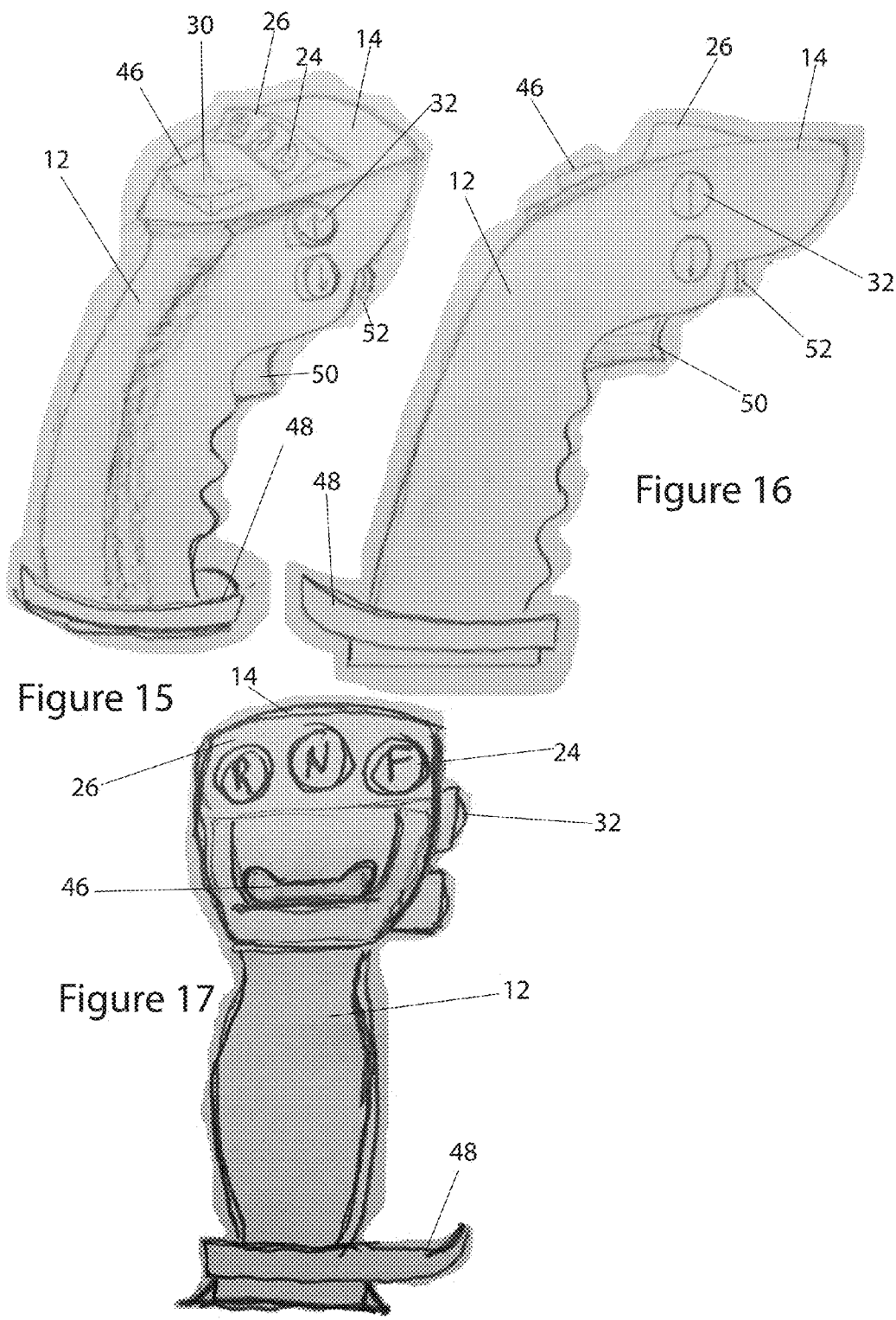

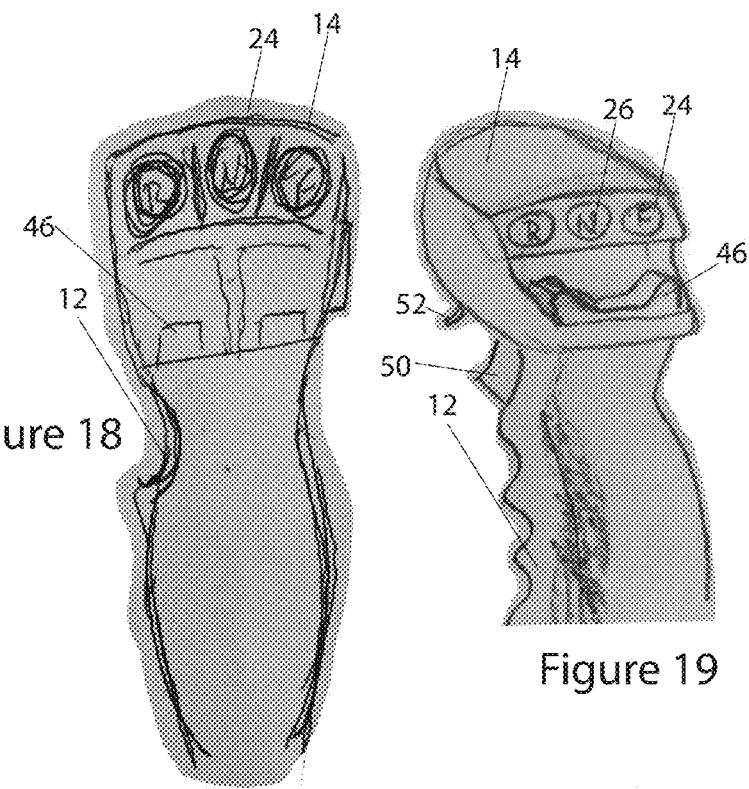
Figure 18
Figure 19
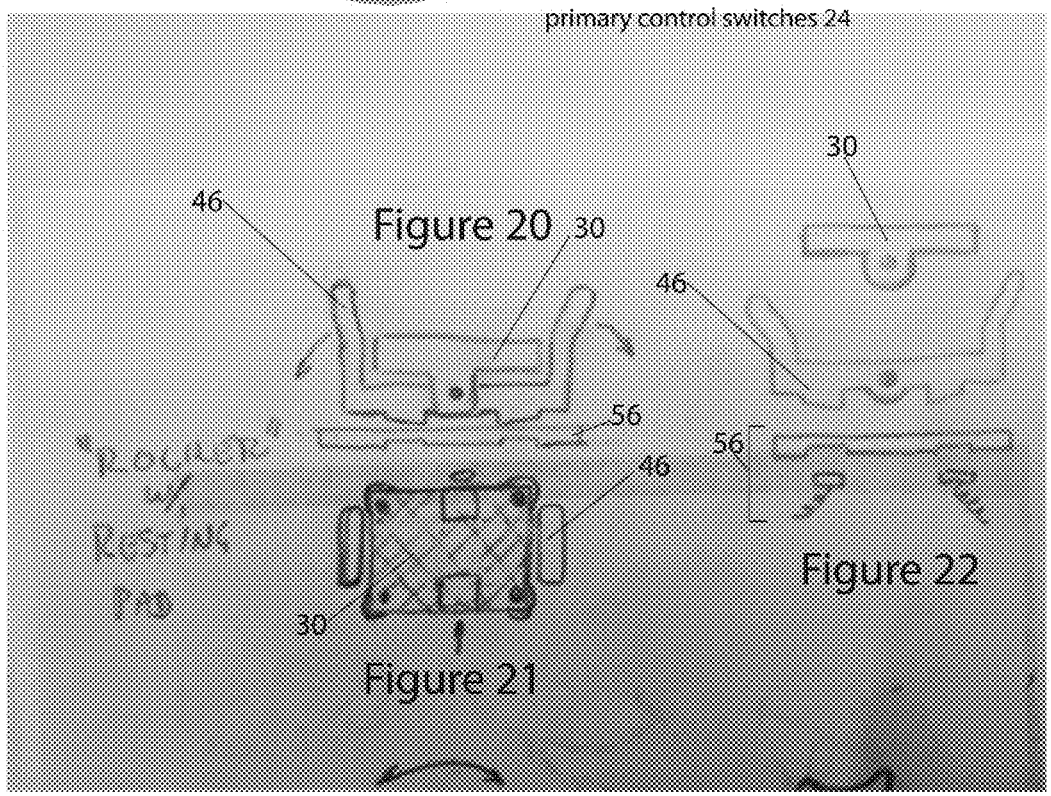
Figure 20
Figure 21
Figure 22

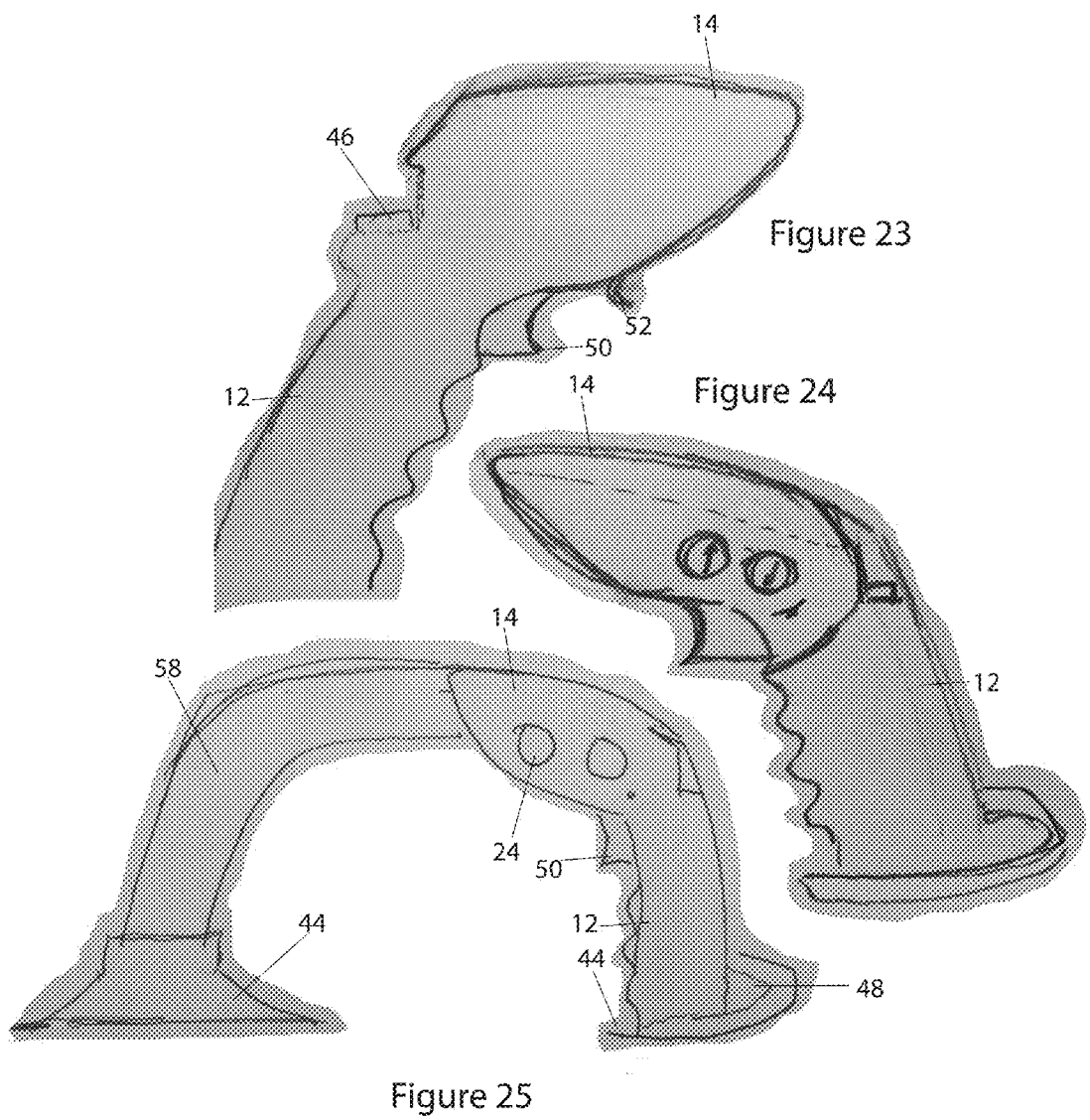

INTEGRATED GRAB BAR AND NAVIGATION CONTROLLER

CROSS REFERENCE TO RELATED APPLICATION

This application is a U.S. Utility Patent Application of U.S. Provisional Patent Application No. 61/981,747, filed Apr. 19, 2014, the disclosure of which is incorporated herein in its entirety.

TECHNICAL FIELD

The present invention relates to a navigation controller for a moving vehicle. More particularly, the present invention relates to an integrated grab bar and navigation controller for a moving vehicle such as a watercraft.

BACKGROUND OF THE INVENTION

A conventional joystick is a user input device that includes a stick that pivots on a base and outputs control signals that indicate the angle and/or direction of the stick. A joystick is also known as the control column and has been the principal control device for many civilian and military aircraft, either as a center stick or side stick. Conventional joysticks are also used for controlling heavy equipment, remote control of unmanned vehicles, wheelchairs, surveillance cameras, and even lawn mowers.

A conventional joystick is typically a two-axis input device, an example of an electronic two-axis joystick was invented at the United States Naval Research Laboratory (NRL) in 1926 (see, for example, U.S. Pat. No. 1,597,416). Most joysticks today are two-dimensional, having two axes of movement, up/down and left/right. A joystick is generally configured so that moving the stick left or right signals movement along the X axis, and moving it forward (up) or back (down) signals movement along the Y axis. The output of a typical analog joystick indicates an angle measure of the movement in any direction in the plane or the space (typically using potentiometers), The output of a typical digital joystick, on the other hand, indicates only on-off signals for four different directions and its mechanically possible combinations (such as up-right or down-left). There are conventional joysticks that also include haptic feedback capability. These joysticks, typically known, for example, as force-feedback joysticks, are active devices, not just input devices. Usually, in the case of a haptic feedback joystick a computer can return a signal to the joystick that causes motors or other mechanisms connected to the stick to resist movement with a returning force or make the joystick vibrate. An example of a force feedback joystick can be found at U.S. Pat. No. 5,742,278.

Recently, joystick control has been made available for docking maneuvers of a yacht, or other relatively larger vessel. Such joysticks deflect left, right and to all points between, and also twist, making a joystick convenient for controlling the propulsion and steering during docking.

A "3 axis" joystick, such as the OPTIMUS 360, manufactured by Seastar Solutions, is typically used for low speed docking and at best is able to meet the requirements of IP68, for example, submersible to 3M, and rated for salt fog spray. Other manufacturers, such as Yamaha also manufacture 3 axis joysticks that may meet the IP68 standard for submersion and fog spray.

Conventional joysticks, especially those used for controlling boats on the water, are typically not weatherproof even though they are inherently exposed to high humidity, corrosive and wet environments. In particular, because a typical navigation joystick must pivot in order to perform its intended function, it is not possible to utilize the same hand used to control the navigation of the watercraft and to use the joystick as an effective grab bar to steady the user against movement caused by an applied force, such as that resulting from a wave or motion of the watercraft.

Inherent in the use of a watercraft is bumping and jostling of the user's body during navigation control of the watercraft. A conventional joystick requires the stick to be pivoted during use, so it is not effective as a grab bar. Likewise, a grab bar is not effective for use as a conventional pivoting joystick. A user has to use his hands to grip a grab bar to steady against an applied external force caused by, for example, a wave hitting the watercraft. Ideally, simultaneously with holding onto the grab bar for stability the user should be able to control the navigation of the watercraft. Ideally, the user is able to maintain steady and constant control of the watercraft, while resisting jostling caused by the motion of the watercraft.

SUMMARY OF THE INVENTION

The present invention is intended to overcome the drawbacks of the prior attempts. In accordance with exemplary embodiments, a rigidly fixed grip member and control head maintains the necessary spacial relationship between the thumb of the gripping hand and the primary control switches needed for navigation while under weigh, and maintain a strong grip on the grip member and/or control head acting as a grab bar with easy thumb-actuated navigation control regardless of the motion of the vehicle. In the case of a watercraft, in particular, a small watercraft such as a dingy, a waggling joystick is a navigation hazard in a rough seaway whereas the present invention provides convenient thumb controls on a fixed grip maintain reliable navigation control while enabling a robust and steady grab bar to resist unwanted movement of the user's body.

In accordance with an embodiment of the present invention, a navigation controller for a watercraft is provided. A force transfer member transfers an applied force to a structural member, such as the floor, transom, engine mount, armrest or other structure member of a watercraft. A mount is rigidly fix to the force transfer member for transferring the applied force to the force transfer member. A grip member and control head are configured and dimensioned to be grabbed by a hand of a user and transfer the force to the mount. The grip member is rigidly mounted to the mount for transferring the applied force to the mount. The grip member is engagable by fingers on the hand of the user for providing a grab bar to the user to resist movement of the body of the user caused by the applied force. The applied force is transferred through the hand of the user to the grip member to the mount to the force transfer member to the structural member to dissipate the applied force in resisting excessive movement of the body of the user caused by the applied force. Control switches generate control output signals for controlling the operation of the watercraft. A control plate supports the control switches and is disposed on the control head near to the grip member and positioned, configured and dimensioned relative to the grip member to enable a thumb of the user to engage with one or more of the control switches while the fingers remain engaged with the grip member and/or control head so that the resistance of the applied force to keep the user steady does not cause an unintended activation of one or more of the control switches.

A tactile location indicator is disposed on the control plate provides easy and rapid location indication of the thumb's position relative to the control switches by haptic feedback.

In accordance with another aspect of the invention, a navigation controller for a watercraft is provided comprising a force transfer member for transferring an applied force to a structural member of a watercraft. A mount is rigidly fix to the force transfer member for transferring the applied force to the force transfer member. A grip member and control head are configured and dimensioned to be grabbed by a hand of a user. The grip member and control head are rigidly mounted to the mount for transferring the applied force to the mount. The grip member and control head are engagable by fingers on the hand of the user for providing a grab bar to the user to resist movement of the body of the user caused by the applied force.

For example, the applied force may be caused by the movement of a user's body resulting from a wave or the watercraft taking a sharp turn, and the applied force is applied to the grip member through the arm and hand of the user and transferred through the mount and through the force transfer member to a structural members, such as the floor, of the watercraft.

The applied force is transferred through the hand of the user to the grip member to the mount to the force transfer member to the structural member to dissipate the applied force in resisting excessive movement of the body of the user caused by the applied force.

Control switches are provided for generating control output signals for controlling the navigation of the watercraft. A control plate supports the control switches. The control plate is disposed near to the grip member and positioned, configured and dimensioned relative to the grip member to enable a thumb of the user to engage with one or more of the control switches while the fingers remain engaged with the grip member. Unlike a conventional joystick or steering wheel used for navigation control of a vehicle, such as a watercraft, in accordance with the present invention the grip member and control head are rigidly fixed. The fingers of the user remain engaged with the grip member, and the grip member and control head are rigidly mounted during operation of the switches so that the resistance of the applied force to keep the user steady does not cause a unintended activation of one or more of the control switches, while the user's grip on the grip member and/or control head is still effective to steady the user against the applied force.

A tactile location indicator disposed on the control plate. The tactile location indicator is positioned on the control plate so that when not activating a control switch, the thumb of the user's hand rests on the tactile location indicator to facilitate quick locating of a particular control switch by the thumb while the fingers remain engaged with the grip member.

In accordance with another aspect of the invention, a navigation controller is provided for a vehicle, such as a watercraft. A force transfer member transfers an applied force to a structural member of a watercraft. A mount is rigidly fix to the force transfer member for transferring the applied force to the force transfer member. A first grip member and control head are configured and dimensioned to be grabbed by a right hand of a user and a second grip member and control head are configured and dimensioned to be grabbed by a left hand of the user. The grip members are both rigidly mounted to the mount for transferring the applied force to the mount and a yoke may be provided rigidly fixing the two grip members to each other. The right grip member and control head are engagable by fingers on the right hand of the user for providing a grab bar to the user to resist movement of the body of the user caused by the applied force. The left grip member and control head are engagable by fingers on the left hand of the user for providing a grab bar to the user to resist movement of the body of the user caused by the applied force. The applied force is transferred through either or both the right hand and the left hand of the user to the respective grip member to the mount to the force transfer member to the structural member to dissipate the applied force in resisting excessive movement of the body of the user caused by the applied force. Control switches generate control output signals for controlling the navigation of the watercraft. A control plate supports the control switches and is disposed near to one of the right grip member and the left grip member and positioned, configured and dimensioned relative to the respective grip member to enable a thumb of the user to engage with one or more of the control switches while the fingers remain engaged with the respective grip member. A tactile location indicator is disposed on the control plate to facilitate quick locating of a particular control switch by the thumb while the fingers remain engaged with the grip member.

The foregoing objects are solved and the drawbacks of the conventional navigation control joysticks are overcome by the solution given in the characterizing parts of the main independent claims. Further advantageous embodiments of the present invention are laid down in the corresponding subclaims dependent on the main claims.

BRIEF DESCRIPTION OF THE DRAWINGS

The invention will be shown in more detail in the following description in accordance with the drawing in which embodiments are shown and in which:

FIG. 2 is a side perspective view of an exemplary embodiment;

FIG. 3 is a back perspective view of an exemplary embodiment;

FIG. 5 is an exploded perspective view of an exemplary embodiment showing a rigidly fixed mounting post disposed on a force transfer member;

FIG. 15 is a perspective view of an exemplary embodiment showing a rocker switch for controlling the direction of the vehicle and trigger switches for controlling the speed of the vehicle, with a palm heel rest;

FIG. 16 is side view of the embodiment show in FIG. 15;

FIG. 17 is a front view of the embodiment shown in FIG. 15;

FIG. 18 is a view of another embodiment;

FIG. 19 is a partial perspective view of the embodiment shown in FIG. 18;

FIG. 20 is a side view schematically shows an inventive rocker switch with a tactile indicating resting pad;

FIG. 21 is a top view schematically illustrating the rocker switch shown in FIG. 20;

FIG. 22 is an exploded view schematically illustrating the rocker switch shown in FIG. 20;

FIG. 23 is a side view of another exemplary embodiment;

FIG. 24 is an opposite side view of the embodiment shown in FIG. 23;

FIG. 25 illustrates an exemplary embodiment showing the grip member including a bent tubular member;

DETAILED DESCRIPTION OF THE INVENTION

Figure 1:
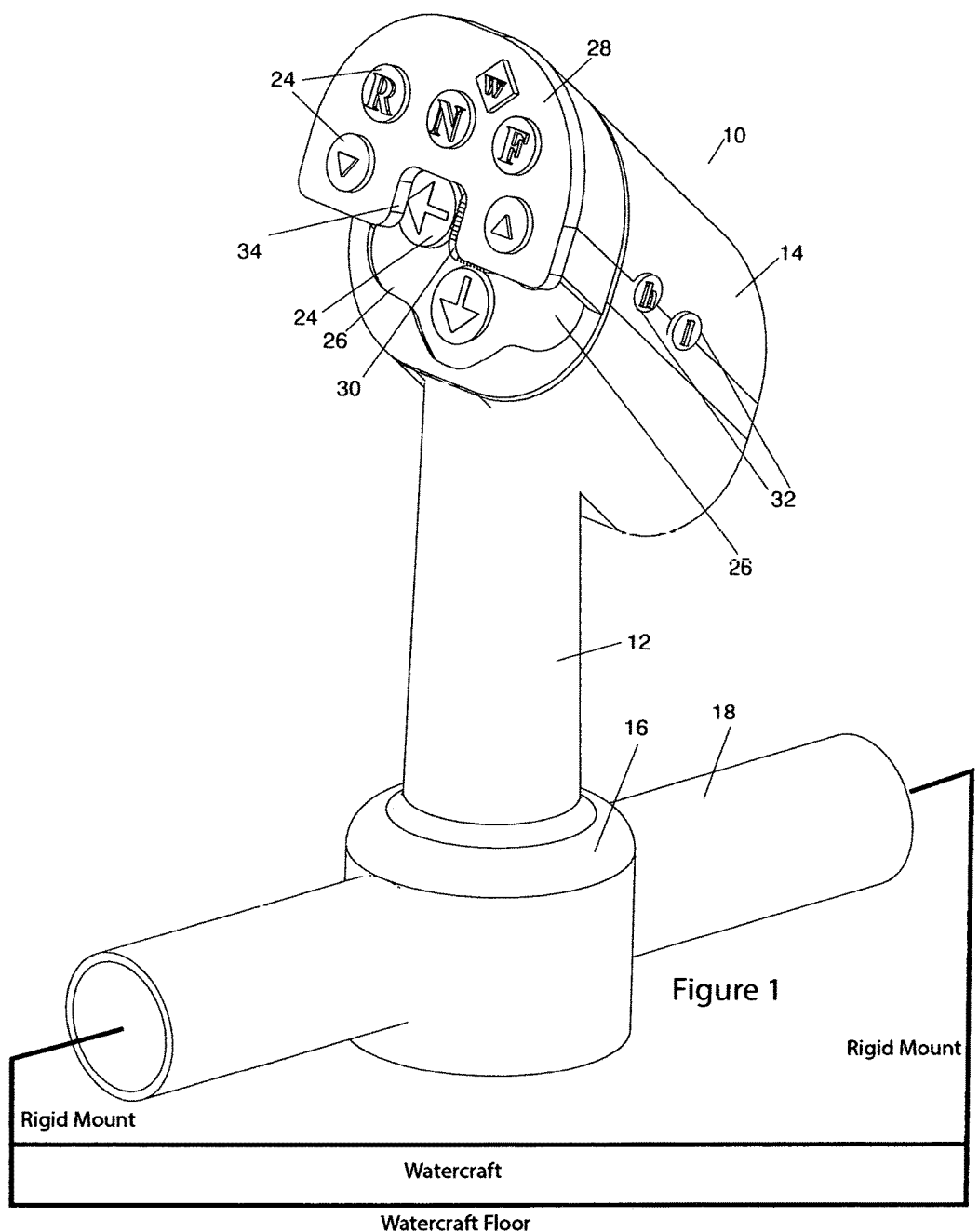
FIG. 1 is a perspective view of an exemplary embodiment of the inventive integrated grab bar and navigation controller schematically showing a force transfer member for transferring an applied force to a floor of a watercraft.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

A conventional joystick has a number of drawbacks, especially when used for the operation of a vehicle, such as a watercraft. Inherent in the use of a watercraft is bumping and jostling of the user's body during navigation control of the watercraft. Since a conventional joystick requires the stick to be pivoted during use, it is not effective as a grab bar. Likewise, since a grab bar has to remain rigidly fixed to be effective for steadying a user when resisting an applied force, such as that caused by the movement of a wave on the watercraft, a grab bar is not effective for use as a conventional pivoting joystick. A user has to use his hands to grip a grab bar to steady against an applied external force caused by, for example, a wave hitting the watercraft. Preferably, since the user has only two hands, both hands are available as necessary to hold tight to a grab bar when, for example, a large wave hits. Ideally, simultaneously with holding onto the grab bar that user should be able to control the navigation of the watercraft. Ideally, the user is able to maintain steady and constant control of the watercraft, while resisting jostling caused by the motion of the watercraft. In accordance with exemplary embodiments, a rigidly fixed grip member 12 and control head 14 maintains the necessary spacial relationship between the thumb of the gripping hand and the primary control switches 24 needed for navigation while under weigh, and maintain a strong grip on the grab bar and easy thumb-actuated control regardless of the motion of the vehicle.

Conventional thumb stick switches for joysticks and fixed grip joy sticks are typically designated IP-68. These are designed to be submersible to 1-3 meters (depending on design). These conventional switches are not designed to be exposed in a high pressure water stream, and are typically intended to operate in an outdoor environment. For the IP standards, "waterproof designation" begins with IP-66, only IP 69 carries the "waterproof at depth & under high pressure spray". The use of a conventional waterproof switch that is not designed specifically for water at depth and under high pressure spray will likely fail in the severe conditions of a marine environment, particularly if a small craft were to roll over in a storm or rough seas. In accordance with the inventive integrated grab bar and navigation controller, exemplary embodiments described herein are for use during all phases of regular operation at slow speed, cruising and high speed.

FIG. 1 is a perspective view of an exemplary embodiment of the inventive integrated grab bar and navigation controller 10. FIG. 2 is a side perspective view of an exemplary embodiment. FIG. 3 is a back perspective view of an exemplary embodiment. In accordance with an exemplary embodiment, a navigation controller 10 for a watercraft is provided comprising a force transfer member 18 for transferring an applied force to a structural member of a watercraft. A mount 16 is rigidly fix to the force transfer member 18 for transferring the applied force to the force transfer member 18. A grip member 12 and control head 14 are configured and dimensioned to be grabbed by a hand of a user. The grip member 12 and control head 14 are rigidly mounted to the mount 16 for transferring the applied force to the mount.

A significant advantage of the present invention, having a fixed grip and thumb-controls as compared with the conventional movable joystick, is that the user's ability to fix on the thumb controls location is not disturbed during jostling, because the spacial relationship between the gripping hand and the finger controls is constant, regardless of the motion of the vehicle. In the case of a watercraft, in particular, a small watercraft such as a dingy, a conventional pivoting joystick is a navigation hazard in a rough seaway. In contrast, the inventive integrated grab bar and navigation controller 10 provides effective thumb controls on a fixed grip to maintain reliable navigation control while enabling a robust and steady grab bar to resist unwanted movement of the user's body.

The grip member 12 and control head 14 are engagable by fingers on the hand of the user for providing a grab bar to the user to resist movement of the body of the user caused by the applied force. For example, the applied force may be caused by the movement of a user's body resulting from a wave or the watercraft taking a sharp turn, and the applied force is applied to the grip member 12 through the arm and hand of the user and transferred through the mount 16 and through the force transfer member 18 to a structural members, such as the floor, of the watercraft. The applied force is transferred through the hand of the user to the grip member 12 to the mount 16 to the force transfer member 18 to the structural member to dissipate the applied force in resisting excessive movement of the body of the user caused by the applied force.

Figure 4:
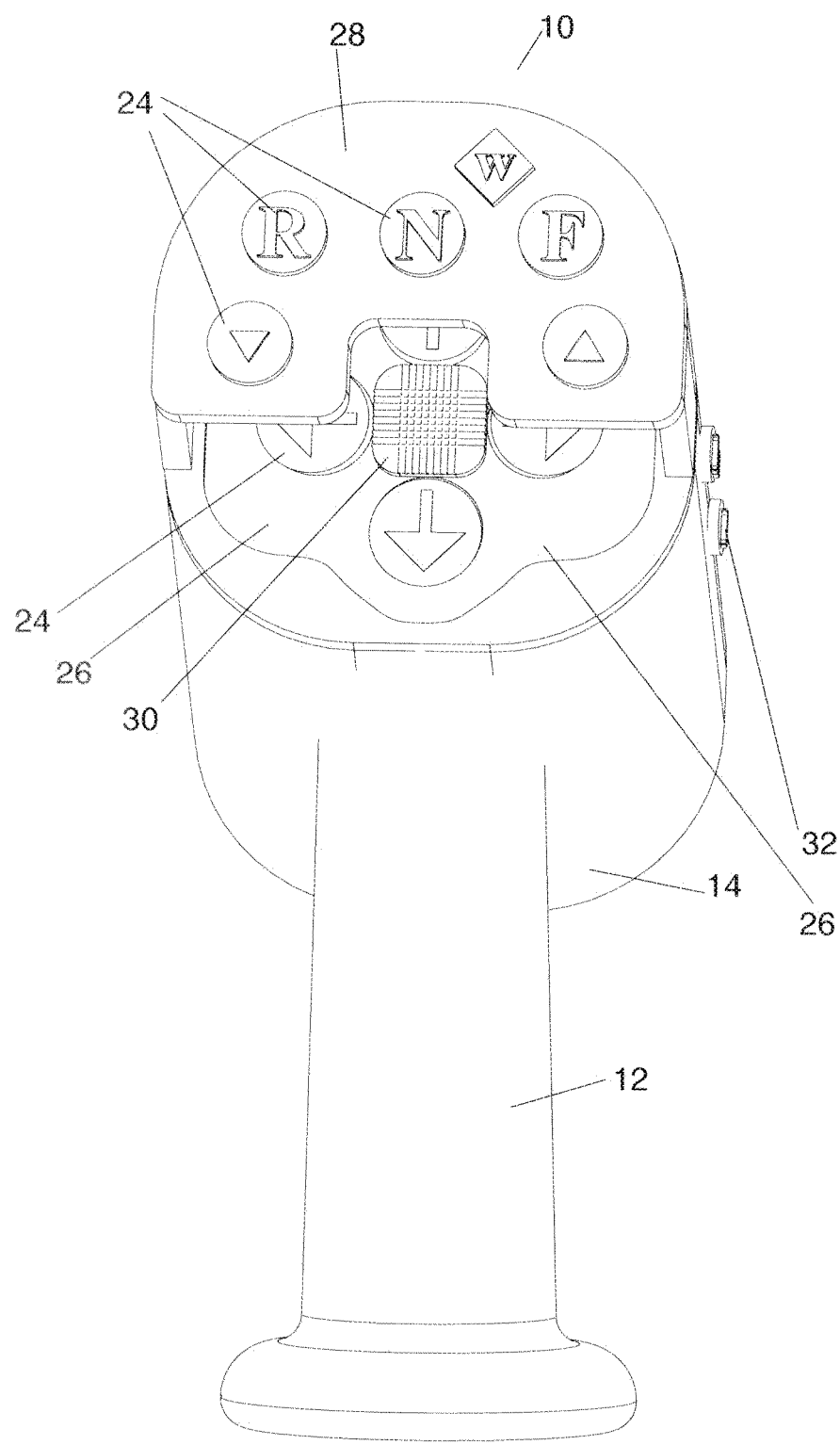
FIG. 4 is a perspective view of an exemplary embodiment.
Figure 6:
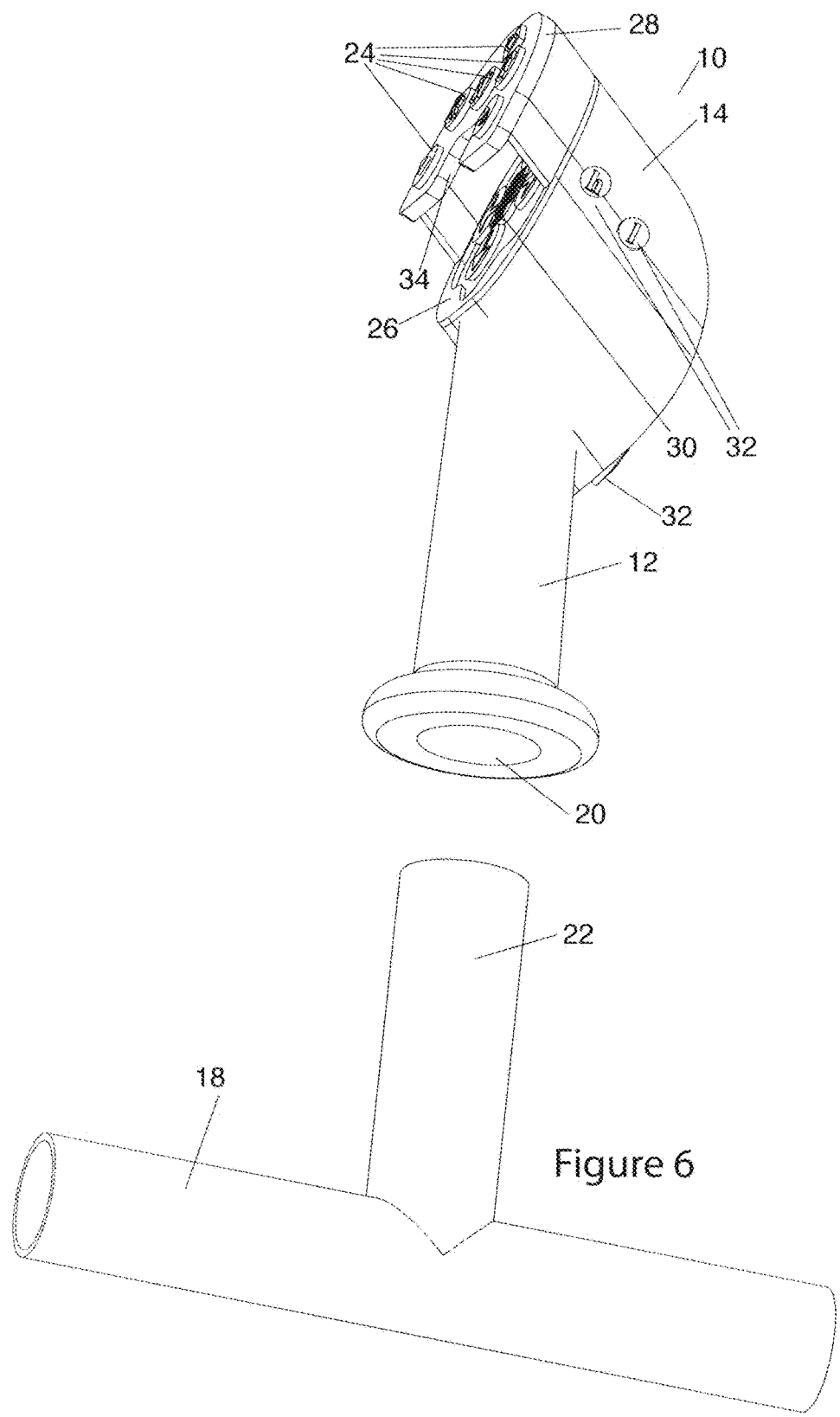
FIG. 6 is an exploded perspective view of an exemplary embodiment showing a mounting hole in a grip member for receiving the rigidly fixed mounting post.
Figure 7:
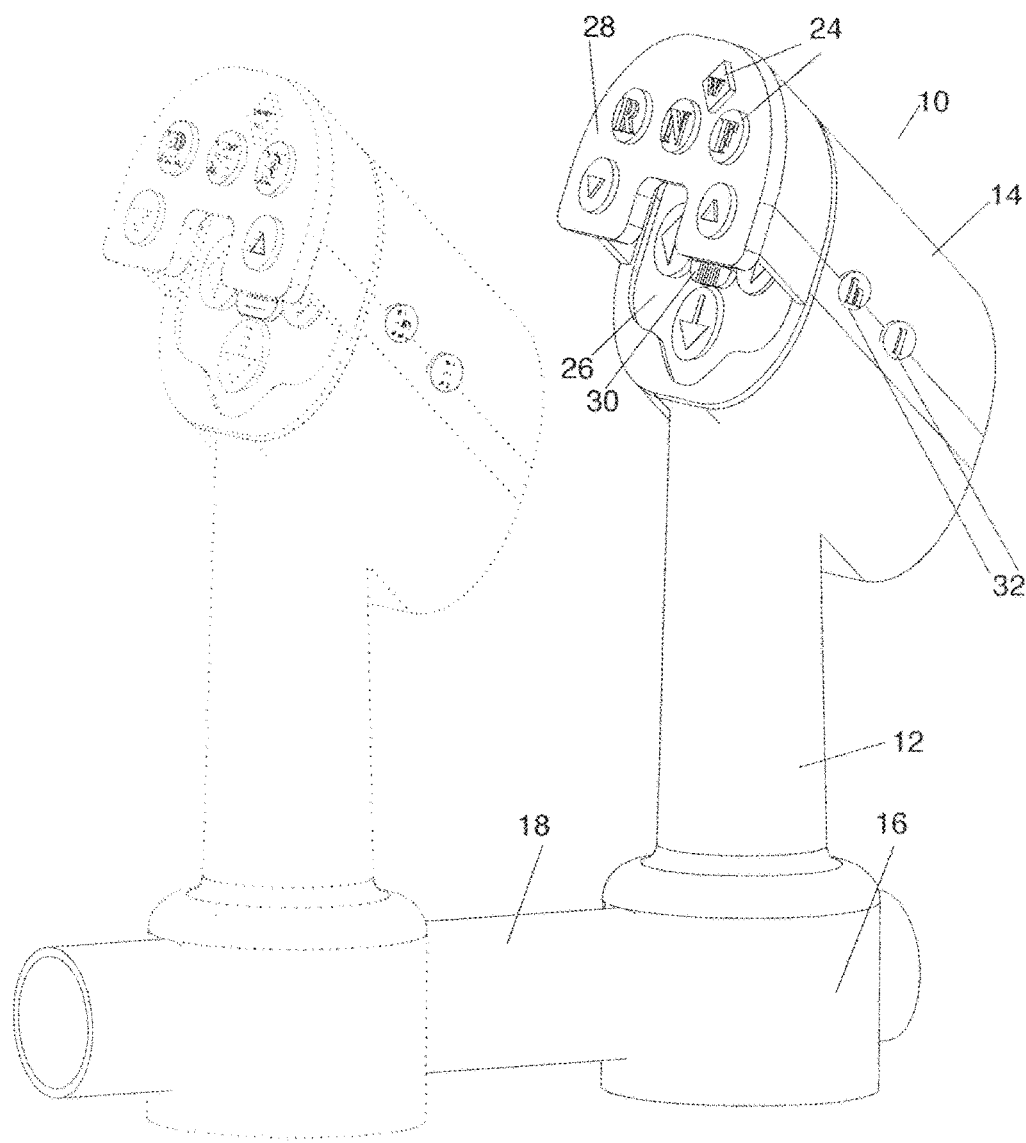
FIG. 7 is a perspective view of an exemplary embodiment.

FIG. 4 is a front perspective view of an exemplary embodiment of the inventive integrated grab bar and navigation controller 10. FIG. 5 is an exploded perspective view of an exemplary embodiment showing a rigidly fixed mounting post 22 disposed on a force transfer member 18 and FIG. 6 is an exploded perspective view of an exemplary embodiment showing a mounting hole 20 in a grip member 12 for receiving the rigidly fixed mounting post 22. In accordance with an exemplary embodiment of the inventive integrated grab bar and navigation controller 10, a weatherproof helm control is provided mounted to a rigidly fixed grip member 12. The grip member 12 includes a control head 14 on which is provided a plurality of control switches 24, enabling a one-handed "drive-by-wire" helm for navigation control of, for example, a single engine outboard, or I/O boat without requiring a conventional console or a conventional steering wheel. The "drive-by-wire" helm uses, for example, servomotors and electronic controllers which may include microprocessors, for electronic control of the navigational aspects of the watercraft, such as steering and throttle, and may also provide electronic control of other aspects of controlling the watercraft such as gear changing, tilt and trim.

In accordance with a non-limiting example, the grip member 12 and control head 14 is fixed to an armrest that acts as a force transfer member 18 for transferring an applied force to a structural member of the watercraft. The watercraft may be, for example, an inflatable boat having a structural member comprising a rigid floor, where the force transfer member 18 transfers the applied force to the floor of the boat. The force transfer member 18 may include a tubular force transfer body with the mount 16 slidably and/or rotationally engaged with the tubular force transfer body to adjust the location of the grip member 12 on the force transfer member 18 during an adjustment process and rigidly fixed to the force transfer member 18 during use of the control switches 24 for controlling the navigation of the watercraft. To accommodate the needs of different users, the mount 16 may include position adjustment means including a releasable clamp for adjusting at least one of the angle, location and rotation of the grip member 12 relative to the force transfer member 18. Alternatively, the force transfer member 18 may be connected to the structure member of the watercraft in a manner that provides for adjusting of the grip member 12 to accommodate the needs of different users.

The grip member 12 may be substantially cylindrical having a longitudinal axis and the control plate 26 may be a substantially planar plate disposed relative to the grip member 12 at a position forming an angle. The adjusting means may be provided to adjust the angle of the control plate 26 relative to the longitudinal axis of the grip member 12. The adjust means may be, for example, a clamp integrated into the mount 16 that allows selective single or multi-axis movement of the grip member 12 relative to the force transfer member. Alternatively or additionally, the adjusting means may include a clamp integrated to the grip member 12 that allows selective single or multi-axis movement of the control head 14 relative to the grip member 12. The mount 16 can be configured to enable movement of the grip member 12 during an adjustment process to adjust of the location of the grip member 12 relative to the force transfer member 18 so that the location of the grip member 12 relative to the body of the user is adjustable during the adjustment process and rigidly fixed to the force transfer member 18 during use of the control switches 24 to control the watercraft.

Figures 8, 9:
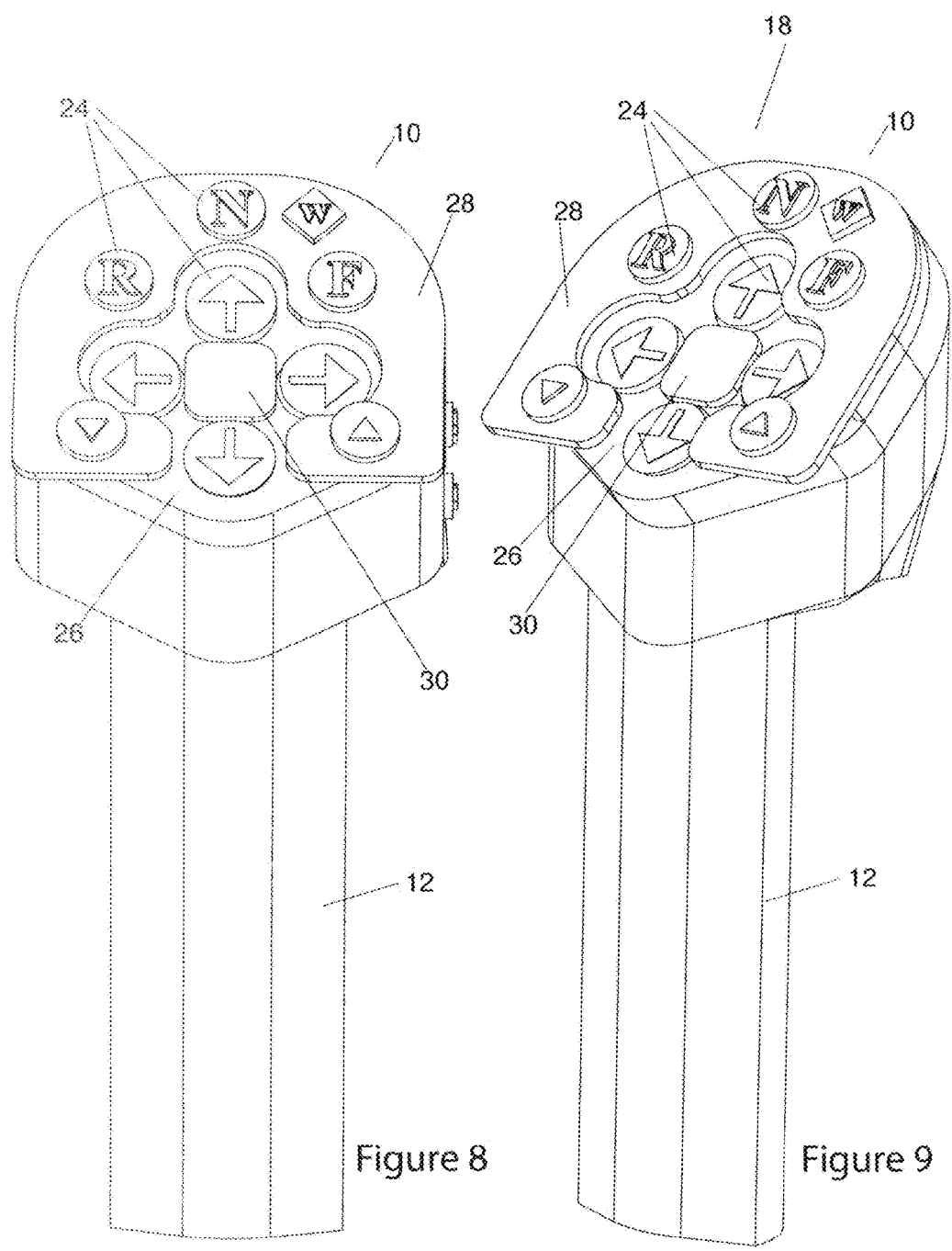
FIG. 8 is a front perspective view of an exemplary embodiment showing a control plate first tier having a parallel second tier switch support plate.
FIG. 9 is a perspective view of an exemplary embodiment showing the control plate first tier having the parallel second tier switch support plate.

FIG. 8 is a front perspective view of an exemplary embodiment showing a control plate 26 first tier having a parallel second tier switch support plate. FIG. 9 is a perspective view of an exemplary embodiment showing the control plate 26 first tier having the parallel second tier switch support plate. In accordance with an embodiment of the present invention, a fixed grip navigation controller 10 is provided having control switches 24 are arrayed on a control plate 26 and a switch support plate 28, in a 2-tier modular arrangement, in a "frequency of use with critical modalities closest" pattern around the area of reach of the user's thumb. By locating the control switches 24 within an area of reach of the user's thumb, the thumb of the user is able to engage with one or more of the control switches 24 while the fingers remain engaged with the grip member 12, so that the resistance of the applied force to keep the user steady does not cause a unintended activation of one or more of the control switches 24, while the user is able to resist the applied force In an exemplary embodiment, the lower tier (the control plate 26), contains a first set of control switches 24 accessible within the area of reach that activate the more frequently accessed and often timing critical control of throttle and steering, arranged, for example, in a diamond pattern around a central tactile location indicator 30 or thumb rest. The top tier (the switch support plate 28) contains a second set of control switches 24 arranged in a horseshoe pattern that activate other navigation control operations such as forward, backward, neutral, trim up, trim down, engine warm up and the like.

The control switches 24 generate control output signals for controlling the navigation of the watercraft. The control plate 26 supports the control switches 24. The control plate 26 is disposed on the control head 14 near to the grip member 12 and positioned, configured and dimensioned relative to the grip member 12 to enable a thumb of the user to engage with one or more of the control switches 24 while the fingers remain engaged with the grip member 12.

A tactile location indicator 30 is disposed on the control plate 26. The tactile location indicator 30 is positioned on the control plate 26 so that when not activating a control switch, the thumb of the user's hand rests on the tactile location indicator 30 to facilitate quick locating of a particular control switch 24 by the thumb while the fingers remain engaged with the grip member 12. The tactile location indicator 30 provides haptic feedback to locate the controls (i.e., the location of the switches). The tactile location indicator 30 may be a textured surface that provides a consistent "home base" position for the thumb of the user, and may include a vibrator to indicate when a switch has been activated.

Figure 10:
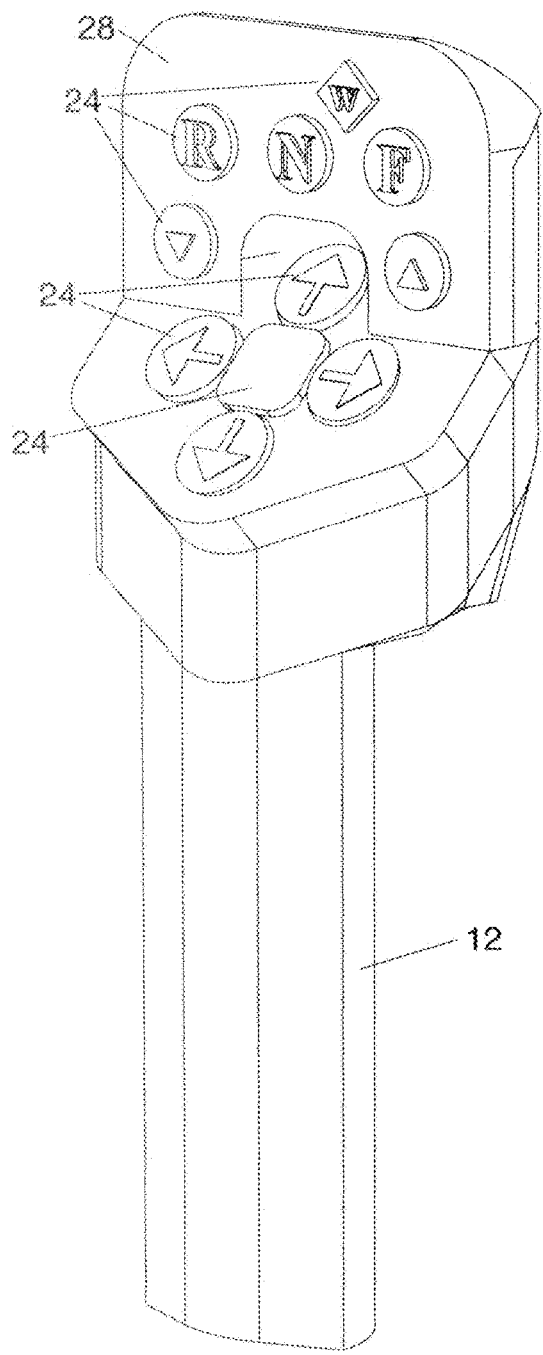
FIG. 10 is a front perspective view of an exemplary embodiment showing the control plate first tier having an upright second tier switch support plate.
Figure 11:
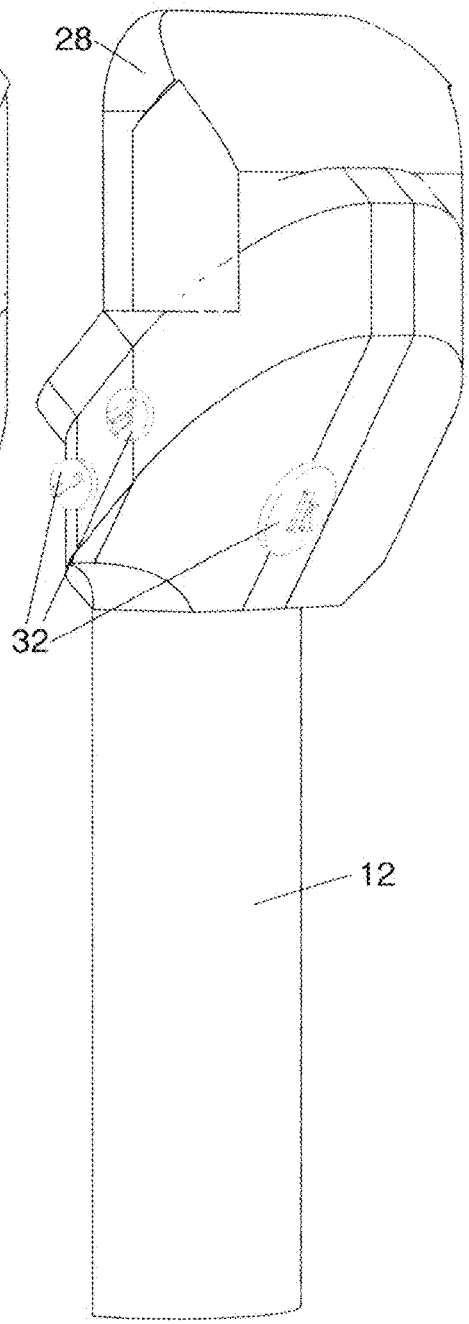
FIG. 11 is a perspective view of an exemplary embodiment showing the control plate first tier having the upright second tier switch support plate.

FIG. 10 is a perspective view of an exemplary embodiment showing the control plate 26 first tier having an upright second tier switch support plate. FIG. 11 is a perspective view of an exemplary embodiment showing the control plate 26 first tier having the upright second tier switch support plate. In accordance with one exemplary embodiment, the control switches 24 include a first set of control switches 24 located on the control plate 26. The first set of control switches 24 comprising a throttle up switch, a throttle down switch, a right turn switch and a left turn switch. The control switches 24 may further include a second set of control switches 24 located on a switch support plate 28. The second set of control switches 24 including a forward switch, a neutral switch, a reverse switch. As shown in FIGS. 10 and 11, the switch support plate 28 may be disposed upright relative to the control plate 26. Alternatively, as shown in FIGS. 8 and 9, the switch support plate 28 may be disposed relatively parallel to the control plate 26.

Unlike a conventional joystick or steering wheel used for navigation control of a vehicle, such as a watercraft, in accordance with the present invention the grip member 12 and control head 14 are rigidly fixed. The fingers of the user remain engaged with the grip member 12, and the grip member 12 and control head 14 are rigidly mounted during operation of the switches so that the resistance of the applied force to keep the user steady does not cause a unintended activation of one or more of the control switches 24, while the grip member 12 and control head 14 are still effective to steady the user against the applied force.

The control switches 24 are provided for generating control output signals for controlling the navigation of the watercraft. In addition to the navigation control, ancillary switches 32 may be provided to enable additional control (navigation and otherwise) of the vehicle, such as a watercraft. The ancillary switches 32 can include, for example, hi/lo (fast, slow), kill (emergency stop all), trim/tilt. Note that the ancillary switches 32 may be located differently than shown, for example, the trim/tilt switch (indicated by the up and down arrows) may be located as part of the cluster of control switches 24 disposed on the switch support plate 28.

In accordance with an embodiment of the inventive integrated grab bar and navigation controller 10, a two-tier switch arrangement is used. A first tier of switches is on the control plate 26, and a second tier of switches is, for example, above the control plate 26 on the switch support plate with a cut out 34 creating a nest and bordering thumb guides over the main navigation switches (steering & throttle).

On the face of the control plate 26, a raised central resting pad made of rubber and having a texture, such as ridges, can be disposed to provide, for example, the textured tactile location indicator 30. The four switch modules used for navigation control may be arranged in a diamond pattern and, for example, in the case of a piezo-electric switch, glued or otherwise fixed to the underside of the control plate 26 for throttle and steering. The face of the control plate 26 may be painted to display the touch sensitive area of each switch and/or a switch button (shown), raised circle (not shown), or other tactile-location representation, may be provided demarcating each control switch 24.

In accordance with an exemplary embodiment, the normal resting position while underway involves one or more of the fingers of the user (preferably all four fingers) positioned around the grip member 12 with the thumb resting on the thumb pad tactile location indicator 30. In accordance with this exemplary embodiment, every switch needed while under way can be reached safely and comfortably without removing fingers or at least having them in immediate range of the grip member 12. As non-limiting examples, ancillary switches 32, such as the hi/lo switch can be provided on the side of the control head 14, and the kill switch may be provided on the back of the control head 14. In accordance with an exemplary embodiment, the trim/tilt switches are located on the second tier (the switch support plate 28) and are positioned on the second tier closest to the thumb of the user.

The second tier switch support plate 28 may act as a guide for the thumb to guide it into the nest and onto the resting pad (the tactile location indicator 30), where the thumb is surrounded by the base tier switches (the first set of control switches 24). This exemplary construction provides the location indicator 30 residing within a home base for the thumb. The thumb then stays comfortably on the thumb pad tactile location indicator 30 while under way. When the thumb is removed, the home base is easily found by the user without having to look down at the grip member 12 or control head 14 by feeling for the tactile location indicator 30 with the thumb.

The second set of control switches 24 located on the second tier switch support plate 28 are arranged such that the ones normally activated while under way are closest to the thumb, for example, the trim/tilt switches. The hand of the user is not required to leave the grip member 12 when activating trim. Likewise, the thumb can return to the home base and easily feel for the location indicator 30 after, for example, trim/tilt switch activation, guided by proprioception alone. The kill and hi/lo switches located on the control head 14 may be activated, for example, by the index or third finger, or by the fingers of the other hand of the user. Shifting the propulsion system into forward (F), neutral (N), and reverse (R) preferably is only be done while the throttle is at dead slow. In the exemplary embodiment of the inventive integrated grab bar and navigation controller 10, those switches are positioned relatively further from the thumb (when resting at the location indicator 30).

Lights, such as LED indicators 36, can be provided, for example, to tell the user what gear the propulsion system is in, and also whether the hi/lo speed toggle is engaged allowing for high speed turning and high speed throttle up/down. The hi/lo switch provides a switch activation sensitivity switch for controlling a rate of change of the navigation control of the watercraft associated with at least one of the control switches 24.

The hi/lo speed toggle may be provided on the side of the control head 14, so it can be activated with the index or third finger while the thumb hits the throttle or direction switch. As shown in the Figures, a kill switch may be provided on the back of the control head 14.

In accordance with a non-limiting example, one or more of the control switches 24 and the ancillary switches 32 may be a piezo electric switch. An example piezo electric switch includes a housing and switch as a complete unit, in this case, a touch plate and switch disk are housed together as a unit. This example piezo electric switch can be, for example, inserted into a hole disposed in the control plate 26, switch support plate 28, grip member 12 or control head 14. An alternative piezo electric switch comprises just the switch disk itself, typically a metal disc measuring about ½" diameter and 3/16" thick. The metal disc may be glued or otherwise fixed to the control plate 26, switch support plate 28, or other locations, and the touch area may include indicia to indicate to the user the location of the control switch 24 or ancillary switch. A piezo electric switch senses pressure via surface tension deflection, with the typical thickness of the material over the switch being 0.5 to 1 mm in thickness. This sensed pressure is used to provide user control over servomotors and other mechanical and electrical elements in a "fly by wire" navigation control system. In accordance with an embodiment of the inventive integrated grab bar and navigational controller 10 piezo electric switches are utilized so that a water tight controller may be provided that has an unbroken surface (that is, no locations where water or dirt can penetrate) yet still enable one handed navigation control of a vehicle, such as a watercraft.

As an example of an important factor that distinguishes piezo switches as superior for outdoor marine application, the control head will accumulate salt deposits in the crevices between the switch plate activation buttons whenever the watercraft is used in a salty, marine environment. High pressure spray from a hose is the best way to clean out these deposits. It is normal routine for boats to be carefully washed down with a high pressure hose when returning from even a short voyage in salt water, in order to remove the salt which gets deposited everywhere. Piezo switches, such as those described herein, can be specifically designed to be unaffected by such cleaning.

The main navigation control switches 24 for throttle and steering (located on the first tier control plate 26) are all reachable with the thumb while under way. The gear change control switches 24 (F, N and R) are the furthest switches for the thumb to reach. Shifting gears, whether into forward, or reverse from neutral, or into neutral from forward or reverse, can only be done with the engine throttled back to idle RPM. The three gear shift switches are preferably positioned and the grip member 12 and control head 14 configured and dimensioned, so these control switches 24 are reached by sliding the hand of the user upward while holding the back of the control head 14 with the fingers of the same hand. Preferably, the grip member 12 and control head 14 (and control plate 26 and switch support plate 28) are configured and dimensioned so that at no time does the user's hand need to abandon its hold on the grip member 12 and control head 14 which act as an integrated grab bar with the control switches 24 acting as a navigation controller 10.

The control switches 24 for forward, neutral and reverse gear shifting may be located furthest from the location indictor because these switches will typically be used only at idle. The control switches 24 used for navigation while under way are preferably located closest to location indicator 30. During navigation, for example, the throttle and steering control switches 24 are activatable by contact applied from the thumb, with the thumb returning between activation to the location indicator 30 so that by feel alone the user maintains control over the activation of the switch and readiness to make course and speed corrections.

The inventive integrated grab bar and navigation controller 10 is effective for many vehicles, especially for watercraft that are typically subjected to jostling due to wave, wind and water action while under way (during navigation). Unlike a conventional joysticks used for controlling a vehicle, such as a watercraft, the inventive integrated grab bar and navigation controller 10 can be made watertight and substantially impervious to humidity and damage caused by exposure to corrosive and wet environments. In contrast to a typical navigation joystick, which must pivot in order to perform its intended function, in accordance with the operation of the inventive integrated grab bar and navigation controller 10, the same hand used to control the navigation of the watercraft also provides an effective grip on the grab bar to steady the user against movement caused by an applied force, such as that resulting from a wave or motion of the watercraft.

In accordance with an exemplary embodiment of the inventive integrated grab bar and navigation controller 10, the control switches 24 are arranged into two tiers with the primary or most often used control switches 24 disposed around the core of the thumb's strongest and most comfortable range of motion. For example, the "primary" control switches 24 may be the trim, throttle and steering switches.

These primary control switches 24 are typically the only ones that routinely get activated while under way (during navigation). In accordance with an exemplary embodiment of the present invention, the control switches 24 on the two tiers are slightly offset from each other so that a control switch 24 on the first tier (on the control plate 26) is not quite lined up with a control switch 24 on the second tier (on the switch support plate 28). Further, the ancillary switches 32 on the sides and back of the control head 14 may be activatable using the index (or another) finger of the user's hand. This non-limiting exemplary arrangement of control switches 24 and ancillary switches 32 allows the more critical "primary" switches to be disposed within the thumbs "power orb" and as the various control switches 24 get farther away from the location indicator 30 (which acts as a thumb rest and home base), the thumb's power and motility diminishes. The textured thumb pad (location indicator 30) allows the user to have a base of readiness-to-activate through proprioception at all times, limiting the risk of accidentally activating a "primary" navigation control switch, and without the user having to take his "eyes off the road."

The reverse (R), neutral (N) and forward (F) gearshift control switches 24 are the furthest away, and, in accordance with a preferred construction, the user's handhold must slide upwards (but never off) the grip to reach them. Preferably, the gears can only be shifted when the boat is either in neutral, or idling at dead slow, with the user's hand never needing to completely let go of a handhold (i.e., the grip member 12 and/or the control head 14) when shifting. Thus, in accordance with the present invention, the rigid and non-moving grip member 12 enables an effective grab bar to be provided that in integral with the navigation controller 10 (the control switches 24).

In accordance with the inventive integrated grab bar and navigation controller 10, the user can maintain a whole-hand grip at all times while under way, and still using the same hand that maintains the grip can control the navigation of the watercraft. As a non-limiting example, in accordance an exemplary embodiment of the present invention, the grab bar provided by the grip member 12 and control head 14 meets the ABYC—"American Board and Yacht Council"— standard H-41 for handholds and grab rails and provide resistance for 300 pounds of force applied in any direction.

In accordance with an exemplary embodiment, the control switches 24 on the first tier, the control plate 26, are operable as a kind of "thumbstick" where each switch is activated by moving a thumb contact against a spring, so the user will receive feedback when a switch is activated.

In accordance with the inventive integrated grab bar and navigation controller 10, at no time will the operator have to let go of (unwrap his fingers from) the hand grip (grip member 12 and/or control head 14) to activate the control switches 24. The control switches 24 on the second tier, for example, may be reached by modifying one's grip, sliding the hand upwards on the grip to curl the fingers around gripping the control head 14, which now permits the operator to comfortably reach the gear shift buttons with the thumb. Once the shifting is done, the hand then slides back down the grip member 12, and the thumb returns to the location indicator 30 before accelerating (getting under way). The fingers maintain their wrap on the grip member 12 and/or control head 14 during the entire maneuver.

In accordance with the inventive integrated grab bar and navigation controller 10, the grip member 12 and control head 14 are rigidly fixed in place so it can function as a "handhold" grab bar. In accordance with a non-limiting exemplary embodiment, a mount 16 made of tubular stainless steel is welded in place on a tubular force transfer member 18, and the grip member 12 and control head 14 are fixed to the mount. In accordance with another non-limiting exemplary embodiment, the mount 16 is movable on the force transfer member 18.

The inventive integrated grab bar and navigation controller 10 is preferably made from corrosion resistant materials that can withstand weather, pressure washing and salt spray. As an example, piezo switches, such as those utilized by US Navy divers to operate equipment in the open sea at 400 feet below the surface of the water can be employed for the navigation controller 10.

Piezo electric switches can be utilized for control switches 24 that enable water tight enclosure of the, for example, the control plate 26 fixed to the control head 14. The control switches 24 can be indicated by indicia painted, embossed, silk screened, cast, or other wise indicated on an unfenestrated surface of the control plate 26 fixed on the grip member 12. In accordance with this aspect of the invention, there is no opening in the faceplate for water infiltration. There is a pressure receptor below the control plate 26, on the interior of the control head 14, and inside a sealed container, that is activated by pressing, for example, a painted area indicating the location of the switch on the control plate 26. In accordance with an aspect of the present invention, the location of the control switches 24 may be indicated by raised borders around the control plate 26 and/or the switch support plate 28, to present to the finger tactile identification. One or more of the control switches 24, for example, the gearshift control switches 24 located on the switch control plate 26, may be back lit and may be visible in sunlight. The preferred positioning and orientation of the control switches 24 relative to the hand of the user gripping the grip member 12 and relative to each other enable operation of a watercraft, such as a single engine boat, while getting under way, docking, cruising, in a seaway, etc., without the user having to "take his eyes off the road".

In accordance with a non-limiting exemplary embodiment, the location indicator 30 on which the thumb rests does not activate anything, but rather provides a consistent tactile indicator for the user to locate by feel alone where the relative locations of the control switches 24 are as they relate to the user's thumb. At the location indicator 30, the thumb is able to rest, without any strain, while the user's fingers are wrapped around the grip member 12 to hold onto and resist unwanted movement of the user's body caused by an applied force resulting from a wave or movement of the watercraft while under way. At the same time, the user remains ready to alter speed or course at all times, even in rough sea conditions, without accidental course or speed change caused by applying a force to the grip member 12 (which would likely often occur if the grip member 12 were part of a conventional pivoting joystick). Minor course corrections and speed adjustments are performed with great frequency and are easily achieved by the thumb activating the navigation control switches 24 starting the known position and location of the thumb located at the location indicator 30. As an analogy, keeping one's thumb on the location indicator 30 is like keeping one's hands on the wheel while driving, even though you are not turning, or like having your foot near the accelerator and brake, even though you are on cruise control.

The tactile location indicator 30 may be positioned on the control plate 26 so that when not activating a control switch, the thumb rests on the tactile location indicator 30 to facilitate quick locating of a particular control switch 24 by the thumb while the fingers remain engaged with the grip member 12.

The mount 16 can include adjustment means to enable the user to adjust the grip member 12 relative to the force transfer member 18, the adjustment being substantially one of a position of the grip member 12 on the force transfer member 18, an angle of the longitudinal axis of the grip member 12 relative to the force transfer member 18 and rotation of the grip member 12 around the longitudinal axis so that the grip of the user's hand, the extension of the user's arm and the angle of viewing of the control switches 24 can be adjusted to suit the needs of the user.

At least some of the control switches 24, for example one or more of the four navigation control switches 24 located on the first tier on the control plate 26 that surround the location indicator 30, may be constructed having small paddles sticking up, which may be spring loaded and give a satisfying resistance when moved. In accordance with a non-limiting example, such a switch is activated by pressing the paddle away from the location indicator 30.

The control switches 24 may include a second set of control switches 24 located on a switch support plate 28, the second set of control switches 24 including a forward switch, a neutral switch, a reverse switch. The switch support plate 28 may be disposed relatively perpendicular to the control plate 26. Alternatively, the switch support plate 28 may be disposed relatively parallel to the control plate 26. The ancillary switches 32 can include a switch activation sensitivity switch (hi/lo) for controlling a rate of change of the navigation control of the watercraft associated with at least one of the control switches 24. The ancillary switch can also include at least one of a kill switch for quickly shutting down an engine of the watercraft and a warm up switch for warming up the engine of the watercraft.

At least two of the control switches 24 are thumb activated switches located within a range of motion of a thumb on the hand of the user so that the thumb activated switches are activatable by the thumb while maintaining a grip on the stick member by the hand of the user. In accordance with a non-limiting exemplary embodiment, the control switches 24 are piezoelectric switches mounted on the control plate 26, and the control plate 26 is a seamless plate member.

In accordance with an embodiment of the inventive integrated grab bar and navigation controller 10, a starboard armrest acts as a force transfer member 18 to hold the grip member 12. The armrest is rigidly fixed to a structural member of the watercraft, such as through a seat fixed to the floor of the watercraft. Preferably, to meet or exceed third party specifications for a marine grab bar, the grip member 12 and control head 14 are able to withstand substantially 300 pounds of force in any direction without movement relative to the force transfer member 18.

In accordance with a non-limiting exemplary embodiment, a strap may also be provided, for example, attached to the seat between the driver and passenger. This strap provides a second handhold that can be grabbed by the other hand of the user that is not being used for navigation control.

Figure 12:
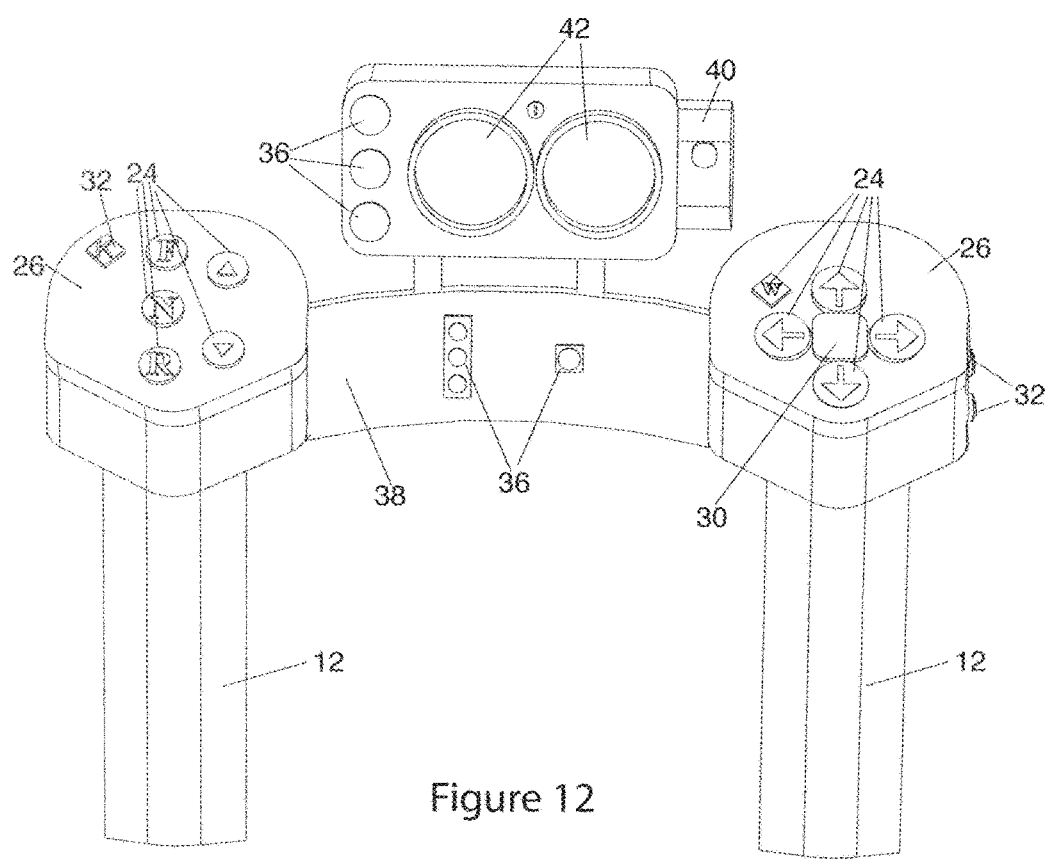
FIG. 12 is a front perspective view of an exemplary embodiment having a pair of grip members and control heads.
Figure 13:
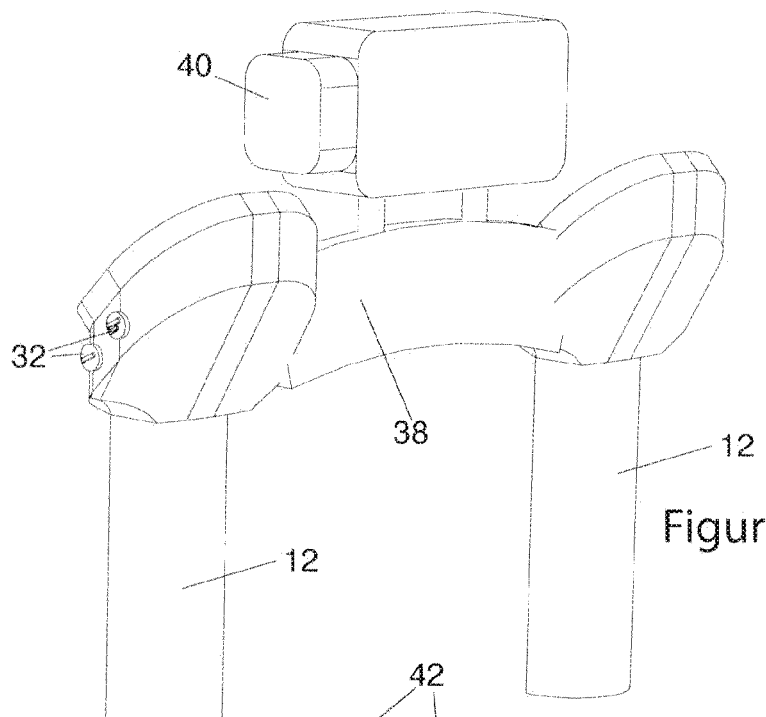
FIG. 13 is a back perspective view showing the exemplary embodiment having the pair of grip members and control heads.
Figure 14:
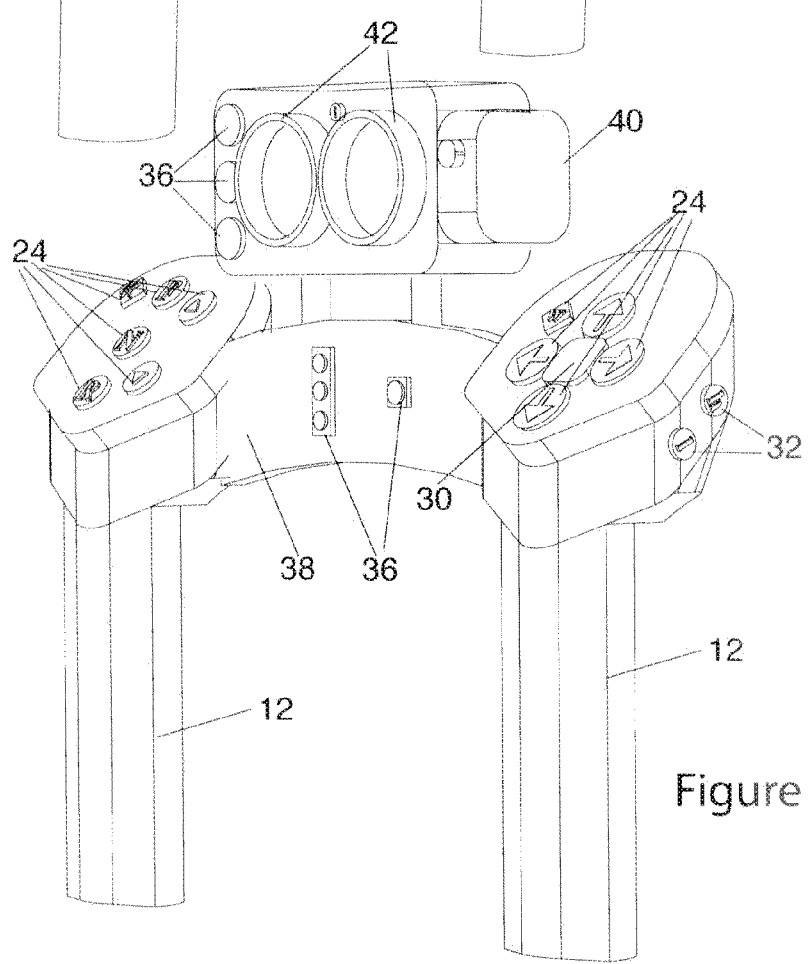
FIG. 14 is a perspective view showing the exemplary embodiment having the pair of grip members and control heads.

FIG. 12 is a front perspective view of an exemplary embodiment having a pair of grip members and control heads. FIG. 13 is a back perspective view showing the exemplary embodiment having a pair of grip members and control heads. FIG. 14 is a perspective view showing the exemplary embodiment having a pair of grip members and control heads. A two-handed grip can be provided for larger boats, with controls similar to a gaming controller used, for example, for X-Box and Playstation video games. In accordance with another aspect of the invention, a navigation controller 10 is provided for a vehicle, such as a watercraft. A force transfer member 18 transfers an applied force to a structural member of a watercraft. A mount is rigidly fix to the force transfer member 18 for transferring the applied force to the force transfer member 18. A first grip member 12 and control head 14 are configured and dimensioned to be grabbed by a right hand of a user and a second grip member 12 and control head 14 are configured and dimensioned to be grabbed by a left hand of the user. The grip members are both rigidly mounted to the mount 16 for transferring the applied force to the mount 16. The right grip member 12 and control head 14 are engagable by fingers on the right hand of the user for providing a grab bar to the user to resist movement of the body of the user caused by the applied force. The left grip member 12 and control head 14 are engagable by fingers on the left hand of the user for providing a grab bar to the user to resist movement of the body of the user caused by the applied force.

The applied force is transferred through either or both the right hand and the left hand of the user to the respective grip member 12 to the mount 16 to the force transfer member 18 to the structural member to dissipate the applied force in resisting excessive movement of the body of the user caused by the applied force. Control switches 24 generate control output signals for controlling the navigation of the watercraft. A control plate 26 supports the control switches 24 and is disposed near to one of the right grip member 12 and the left grip member 12 and positioned, configured and dimensioned relative to the respective grip member 12 to enable a thumb of the user to engage with one or more of the control switches 24 while the fingers remain engaged with the respective grip member 12. A tactile location indicator 30 is disposed on the control plate 26 to facilitate quick locating of a particular control switch 24 by the thumb while the fingers remain engaged with the grip member 12.

Indicators 36, such as colored LED lights, can be provided to indicate the status of the control switches 24 and the propulsion system of the vehicle. For example, activating the control switch 24 that shifts the propulsion system of the watercraft into neutral can be indicated by an appropriate LED light. A yoke 38 can be provided to rigidly fix the grip members 12 to each other, and to provide support for a radio 40 and status indicators 42, such as a tachometer, fuel gauge, and the like.

FIG. 15 is a perspective view of an exemplary embodiment showing a rocker switch 46 for controlling the direction of the vehicle, such as a watercraft, and trigger switch throttle up 50 and trigger switch throttle down 52 for controlling the speed of the vehicle, with a palm heel rest 48. FIG. 16 is side view of the embodiment show in FIG. 15. FIG. 17 is a front view of the embodiment shown in FIG. 15. FIG. 18 is a view of another embodiment. FIG. 19 is a partial perspective view of the embodiment shown in FIG. 18. FIG. 23 is a side view of another exemplary embodiment. FIG. 24 is an opposite side view of the embodiment shown in FIG. 23. As shown in the non-limiting, exemplary embodiments, the throttle may be controlled by a trigger switch and the directional switches, F, R, N, can be provided as button switches. An "anti-throttle" (throttle down)switch may be provided to throttle down and slow the watercraft.

As with the other exemplary embodiments shown herein, the inventive grab bar and navigation controller 10 provides a means for safely controlling a watercraft, even when underway in adverse sea conditions. For example, the rigidly fixed grip member 12 can be grabbed to steady the user because it is rigidly mounted to a mount 16 and resists movement in any direction. This mounting enables the transfer of an applied force while the rigidly fixed grip member 12 is gripped by fingers on the hand of the user. Thus, the rigidly fixed grip member 12 provides a reliable grab bar for the user to hold onto, even in severe weather, and resist movement. The movement may be caused by, for example, rocking of the watercraft when hit by a wave. In accordance with this exemplary embodiment, the primary control switches 24 and/or ancillary control switches 32 include at least one rocker control switch positioned on the control plate 26 for generating control output signals for controlling turning of the vehicle. For example, in accordance with an exemplary rocker switch 46, the user's thumb is positioned to roll left or right to actuate the rocker switch 46 and turn the watercraft, while the fingers remain positioned for grasping the fixed grip. Alternatively, or additionally, a rocker control switch may be used to provide throttle-up and throttle-down control of the vehicle. The primary control switches 24 and/or ancillary control switches 32 generate the control output signals that control the navigation of the vehicle. As with the other exemplary embodiments, the mount 16 supporting the rigidly fixed grip member 12 is itself rigidly fixed to a structural member of the vehicle and transfers an applied force, such as caused by the rocking of the watercraft, while the user grips the rigidly fixed grip member 12. The applied force is transferred to the structural member so the user remains steady. The control plate 26 supporting the primary control switches 24 and/or ancillary control switches 32 is disposed near to the rigidly fixed grip member 12 to enable a thumb of the user to engage with one or more of the primary control switches 24, and/or ancillary control switches 32, while the fingers remain engaged with the rigidly fixed grip member 12. This enables the navigation of the vehicle controlled by activation of the primary control switches 24 and/or ancillary control switches 32, by the thumb of hand of the user while the rigidly mounted fixed grip member 12 remains engaged by the fingers of the hand. Thus, the rigidly fixed grip member 12 is structured, configured and dimensioned, to be gripped and provide a rigid grab bar that resists the unwanted and potentially dangerous movement of the user even when the watercraft is at speed and/or in high seas conditions.

A heel rest 48 may also be provided to help orient the hand of the user relative to the location of the grip member 12, the primary control switches 24, the ancillary control switches 32 and other components. This heel rest 48 facilitates the easy access to the navigation control and grab bar aspects of the inventive integrated grab bar and navigation controller 10.

FIG. 20 is a side view schematically showing an inventive rocker switch 46 with a tactile indicating resting pad. FIG. 21 is a top view schematically illustrating the rocker switch 46 shown in FIG. 20. FIG. 22 is an exploded view schematically illustrating the rocker switch 46 shown in FIG. 20. The primary control switches 24 and/or ancillary control switches 32 may include at least one rocker control switch positioned on the control plate 26 for generating control output signals for controlling the turning of the vehicle. For example, in accordance with an exemplary rocker switch 46, the user's thumb is positioned to roll left or right to actuate the rocker switch 46 and turn the watercraft, while the fingers remain positioned for grasping the fixed grip. A tactile indicating resting pad provides a tactile location indicator 30 positioned so that the thumb of the user can rest on the tactile location indicator 30 when controlling the direction of travel by rolling the thumb, or otherwise applying pressure to one side or the other of the location indicator

30. Electrical contact is made by actuating the switch components 56 of the rocker switch 46. The user's thumb can easily locate the resting pad tactile location indicator, even without the user having to look down to find it, and all the while the user's fingers remain engaged with the rigidly fixed grip member 12. Alternatively, or additionally, a rocker control switch may be used to provide throttle-up and throttle-down control of the vehicle.

A conventional joystick may be protected against damage by water or dust, for example, to meet the requirements of IP68. But this requires at least things like sealing the pivot point of the joystick with a rubber boot, epoxy dipping or potting of conductive surfaces, etc., particularly troublesome with conventional switches with moving parts that are difficult to reliably make water and dust proof. A "3 axis" joystick, such as the OPTIMUS 360, manufactured by Seastar Solutions, is typically used for low speed docking and at best is able to meet the requirements of IP68, for example, submersible to 3M, and rated for salt fog spray. Other manufacturers, such as Yamaha also manufacture 3 axis joysticks that may meet the IP68 standard for submersion and fog spray. However, protection against damage by water or dust remains hard to achieve for the conventional joystick. This is in large part because of the difficulty of sealing a pivoting stick that actuates switches with exposed moving parts.

In accordance with the inventive rocker switch 46, a piezo switch element is used in the switch components 56. The piezo switch element is self-contained, inherently water resistant and waterproof (for example, at least up to IP69k standards). Product meeting IP69k can be exposed to 100 bar wash down, using a high pressure hose. Other elements of the switch components 56, such as springs, housing and the pivoting actuator 54, can be made from plastic or metal, such as stainless steel, brass or aluminum. The housing of the inventive rocker switch 46 encompassing the switch components 56 need not be waterproof because piezo switches have no exposed moving parts and are not susceptible to corrosion. For example, piezo switches are currently in use at depths up to 300 feet by the US Navy Seals and are immune to high pressure spray. As an example of a piezo electric switch element, Barantec lists switches meeting IP69k (e.g., dust tight, impervious to salt spray at close range during high pressure wash downs, and operable down to 100M).

In contrast to a conventional switch, such as what might be found on a conventional joystick, activation of the inventive rocker switch 46 does no require any movement of contacts that might be exposed to corrosion or dust, but rather the actuation is through pressure. Piezo switches operate through the application of pressure. The pivoting actuator 54 of the inventive rocker switch applies pressure onto the sealed, self-contained piezo switch element. The piezo switch element is housed, for example, sealed below the exposed control plate 26. The inventive rocker switch 46 can be immersed in salt water down to hundreds of feet and hit with high pressure hose water for cleaning.

The inventive rocker switch 46 includes an actuator 54 that pivots in response to, for example, the thumb of the user rolling right or rolling left to control the direction of the watercraft. Switch components 56 cooperate with the actuator 54 so that the intended control indicated by the user's thumb movement is applied as appropriate control signals to cause the desired steering of the watercraft. The switch components include since there are no moving parts, and the switch is not exposed, there is no issue at depth, with spray or with salt.

In accordance with the non-limiting, exemplary embodiments, the piezo switches are provided for control of the watercraft, while the grip member is available for stability of the user. The user can grip tightly and securely for stability and even while managing sea conditions that rely upon the finger controls of the control switches.

The inventive rocker switch 46 is a highly effective, waterproof and robust solution for controlling the operation of the watercraft. The rocker switch 46 can be positioned to enable the thumb to be used to steer the watercraft while the fingers remain engaged with the grip member 12 to keep the user steady. As described herein, the rigidly fixed grip member 12 is structured, configured and dimensioned, to be gripped and provide a rigid grab bar that resists the unwanted and potentially dangerous movement of the user even when the watercraft is at speed and/or in high seas conditions. In contrast, a conventional joystick for marine use, for example, is only used for low speed, close quarter maneuvering, such when in the harbor and docking.

Figure 26:
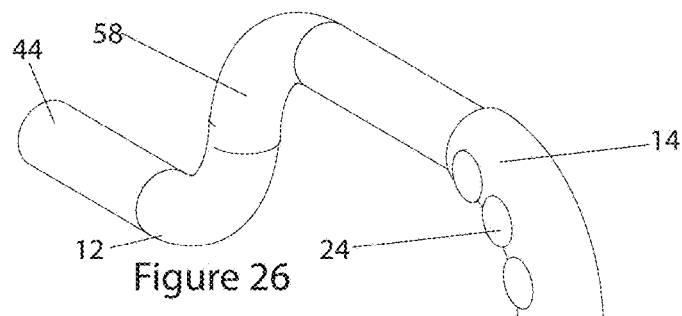
FIG. 26 os a perspective view showing the control head positioned at one side of an upside down U shaped bent tubular member.
Figure 27:
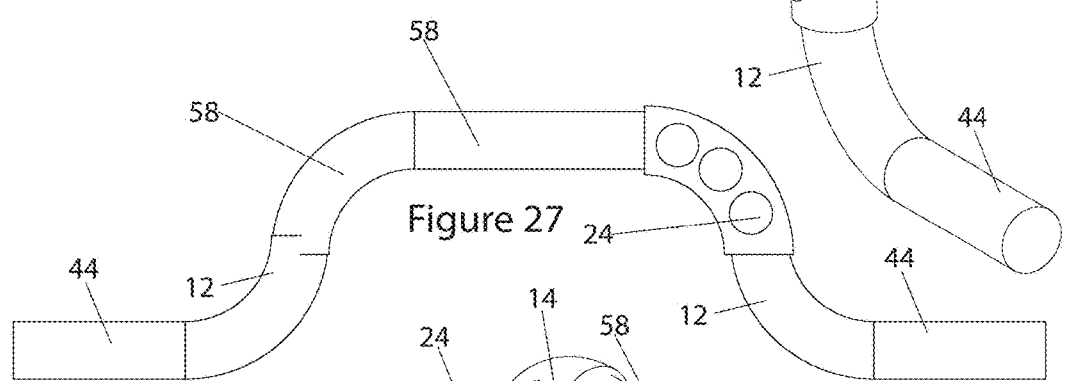
FIG. 27 is a front view of the embodiment shown in FIG. 26.
Figure 28:
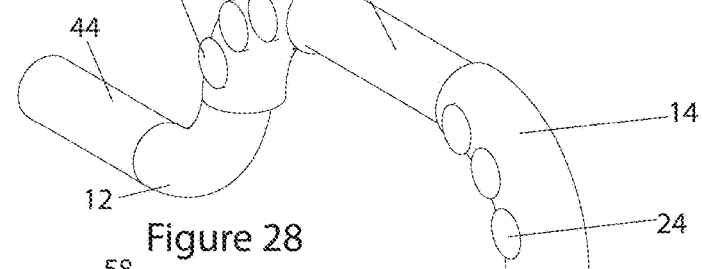
FIG. 28 os a perspective view showing dual control heads positioned at either sides of an upside down U shaped bent tubular member.
Figure 29:
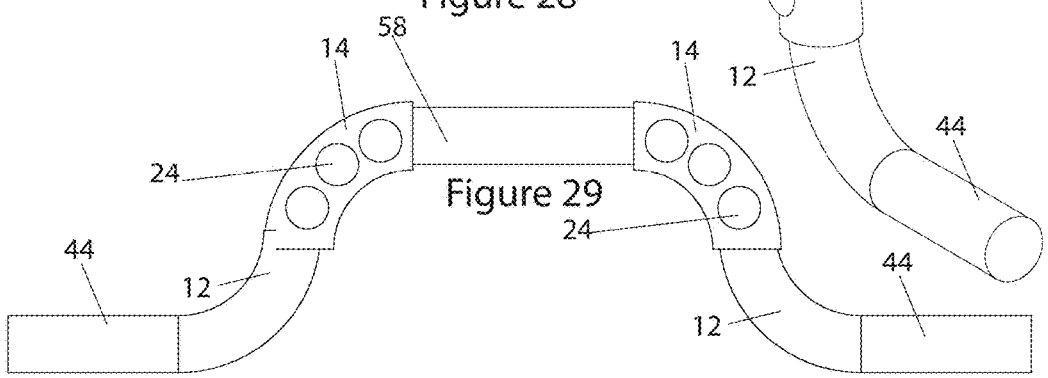
FIG. 29 is a front view of the embodiment shown in FIG. 28.

FIG. 25 illustrates an exemplary embodiment showing the rigidly fixed grip member 12 formed from a bent tubular member, such as rigid stainless steel or aluminum marine grade tubing. As with the other embodiments described here, preferably, the rigidly fixed grip member 12 and related components are able to withstand at least 300 pounds of force in any direction without movement relative to the force transfer member. This construction creates an effective grab bar for use even when the watercraft is at speed and/or experiencing rough weather and/or high seas. FIG. 26 os a perspective view showing the control head 14 positioned at one side of an upside down U shaped bent tubular member. FIG. 27 is a front view of the embodiment shown in FIG. 26. FIG. 28 os a perspective view showing dual control head 14s positioned at either sides of an upside down U shaped bent tubular member. FIG. 29 is a front view of the embodiment shown in FIG. 28. In accordance with other exemplary embodiments of the inventive grab bar and navigation controller 10, the rigidly fixed grip member 12 comprises a bent tubular member 58 having a a fixing portion 44 for rigidly mounting the tubular member 58 to the mount. The control head 14 and/or control plate 26 are disposed along the tubular member 58 and positioned, configured and dimensioned relative to the rigidly fixed grip member 12 to enable a thumb of the user to engage with one or more of the primary control switches 24 and/or ancillary control switches 32 while the fingers remain engaged with the rigidly fixed grip member 12. The bent tubular member 58 can be configured, for example, as an upside down U, with the fixing portion 44 comprising at least one leg extending from the bottom of the upside down U so that the fixing portion 44 can be secured so the applied force is transferred through the hand of the user to the rigidly fixed grip member 12 to a mount 16 to a force transfer member 18 to a structural member to dissipate the applied force in resisting excessive movement of the body of the user caused by the applied force.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

The invention claimed is:

1. A navigation controller for a watercraft, comprising:
a grip member configured and dimensioned to be grabbed by a hand of a user, the grip member rigidly mounted to a mount to resist movement in any direction for transferring the applied force to the mount, the grip member being engagable by fingers on the hand of the user for providing a grab bar to the user to resist movement of the body of the user caused by the applied force;
control switches for generating control output signals for controlling the navigation of the vehicle, wherein the mount is rigidly fixed to a structural member of the vehicle for transferring an applied force to the structural member; and
a control plate supporting the control switches and disposed near to the grip member and positioned, configured and dimensioned relative to the grip member to enable a thumb of the user to engage with one or more of the control switches while the fingers remain engaged with the grip member so that the navigation of the vehicle is controlled by activation of the control switches by the thumb of hand of the user while the rigidly mounted grip member remains engaged by the fingers of the hand to enable the grip member to be gripped to resists the movement of the body of the user without the grip member moving relative to the structural member, the control switches including a switch activation sensitivity switch for controlling a rate of change of the navigation control of the watercraft associated with at least one of the control switches.

2. A navigation controller for a watercraft according to claim 1; further comprising a tactile location indicator positioned on the control plate so that when not activating a control switch, the thumb of the user rests on the tactile location indicator to facilitate quick locating of a particular control switch by the thumb while the fingers remain engaged with the grip member.

3. A navigation controller for a watercraft according to claim 1; wherein the mount includes position adjustment means for adjusting at least one of the angle, location and rotation of the grip member.

4. A navigation controller for a watercraft according to claim 1; further comprising a force transfer member, and wherein the mount is rigidly fixed to the force transfer member and rigidly fixed to the structural member through force transfer member.

5. A navigation controller for a watercraft according to claim 1; wherein the control switches include a first set of control switches located on the control plate, the first set of control switches comprising a throttle up switch, a throttle down switch, a right turn switch and a left turn switch.

6. A navigation controller for a watercraft according to claim 5; wherein the control switches further include a second set of control switches located on a switch support plate, the second set of control switches including a forward switch, a neutral switch, a reverse switch.

7. A navigation controller for a watercraft according to claim 1; further comprising at least one of a kill switch for quickly shutting down an engine of the watercraft and a warm up switch for warming up the engine of the watercraft.

8. A navigation controller for a watercraft according to claim 1; wherein the grip member comprises a bent tubular member having a a fixing portion for rigidly mounting the tubular member to the mount, and the control plate is disposed along the tubular member and positioned, configured and dimensioned relative to the grip member to enable a thumb of the user to engage with one or more of the control switches while the fingers remain engaged with the grip member.

9. A navigation controller for a watercraft according to claim 1; wherein the control switches include at least one rocker control switch positioned on the control plate for generating control output signals for controlling turning of the vehicle.

10. A navigation controller for a watercraft according to claim 1; wherein the control switches include at least one trigger control switch positioned on the control plate for generating control output signals for controlling at least one of throttle-up and throttle down to control the speed of the vehicle.

11. A navigation controller for a watercraft, comprising:
a force transfer member for transferring an applied force to a structural member of a watercraft;
a mount rigidly fix to the force transfer member for transferring the applied force to the force transfer member, wherein the watercraft includes a rigid structural member, and wherein the force transfer member transfers the applied force to the rigid structural member;
a grip member configured and dimensioned to be grabbed by a hand of a user, the grip member rigidly mounted to the mount for transferring the applied force to the mount, the grip member being engagable by fingers on the hand of the user for providing a grab bar to the user to resist movement of the body of the user caused by the applied force, whereby the applied force is transferred through the hand of the user to the grip member to the mount to the force transfer member to the structural member to dissipate the applied force in resisting excessive movement of the body of the user caused by the applied force;
control switches for generating control output signals for controlling the operation of the watercraft;
a control plate supporting the control switches and disposed near to the grip member and positioned, configured and dimensioned relative to the grip member to enable a thumb of the user to engage with one or more of the control switches while the fingers remain engaged with the grip member so that the resistance of the applied force to keep the user steady does not cause a unintended activation of one or more of the control switches; and
a tactile location indicator disposed on the control plate.

12. A navigation controller for a watercraft according to claim 11; wherein the watercraft is a boat having the structural member comprising a rigid floor, and wherein the force transfer member transfers the applied force to the floor of the boat.

13. A navigation controller for a watercraft according to claim 11; wherein the force transfer member includes a tubular force transfer body; and wherein the mount is slidably engaged with the tubular force transfer body to adjust the location of the grip member on the force transfer member during an adjustment process and rigidly fixed to the force transfer member during use of the control switches for controlling the navigation of the watercraft.

14. A navigation controller for a watercraft according to claim 11; wherein the mount is configured to enable movement of the grip member during an adjustment process to adjust of the location of the grip member relative to the force transfer member so that the location of the grip member relative to the body of the user is adjustable during the adjustment process and rigidly fixed to the force transfer member during use of the control switches to control the watercraft.

15. A navigation controller for a watercraft according to claim 11; further comprising a switch activation sensitivity switch for controlling a rate of change of the navigation control of the watercraft associated with at least one of the control switches.

16. A navigation controller for a watercraft according to claim 11; wherein the control switches are piezoelectric switches.

17. A navigation controller for a watercraft according to claim 11; wherein the grip member and control head are able to withstand at least 300 pounds of force in any direction without movement relative to the force transfer member.

18. A navigation controller for a watercraft, comprising:
a force transfer member for transferring an applied force to a structural member of a watercraft;
a mount rigidly fix to the force transfer member for transferring the applied force to the force transfer member;
a right grip member configured and dimensioned to be grabbed by a right hand of a user and a left grip member configured and dimensioned to be grabbed by a left hand of the user, the grip members being both rigidly mounted to the mount for transferring the applied force to the mount, the right grip member being engagable by fingers on the right hand of the user for providing a grab bar to the user to resist movement of the body of the user caused by the applied force, the left grip member being engagable by fingers on the left hand of the user for providing a grab bar to the user to resist movement of the body of the user caused by the applied force, whereby the applied force is transferred through at least one of the right hand and the left hand of the user to the grip member to the mount to the force transfer member to the structural member to dissipate the applied force in resisting excessive movement of the body of the user caused by the applied force;
control switches for generating control output signals for controlling the operation of the watercraft; and
a control plate supporting the control switches and disposed near to one of the right grip member and the left grip member and positioned, configured and dimensioned relative to the respective grip member to enable a thumb of the user to engage with one or more of the control switches while the fingers remain engaged with the respective grip member; and
a tactile location indicator disposed on the control plate.

19. A navigation controller for a watercraft according to claim 18; wherein the mount includes adjustment means to enable the user to independently adjust each of the right grip member and the left grip member relative to the force transfer member, the adjustment being at least one of a position of the respective left and right grip member on the force transfer member, an angle of the longitudinal axis of the respective left and right grip member relative to the force transfer member and rotation of the respective left and right grip member around the longitudinal axis so that the grip of the respective right and left hand of the user, the extension of a respective right and left arm of the user and the angle of viewing of the control switches can be adjusted to suit the needs of the user.

* * * * *